United States Patent
Grubbs et al.

(10) Patent No.: US 6,946,533 B2
(45) Date of Patent: Sep. 20, 2005

(54) SYNTHESIS OF MACROCYCLIC POLYMERS BY RING INSERTION POLYMERIZATION OF CYCLIC OLEFIN MONOMERS

(75) Inventors: Robert Grubbs, South Pasadena, CA (US); Chris Bielawski, Pasadena, CA (US); Diego Benitez, Woodland Hills, CA (US)

(73) Assignee: California Institute of Technology, Pasadena, CA (US)

( * ) Notice: Subject to any disclaimer, the term of this patent is extended or adjusted under 35 U.S.C. 154(b) by 164 days.

(21) Appl. No.: 10/632,528

(22) Filed: Aug. 1, 2003

(65) Prior Publication Data

US 2004/0132934 A1 Jul. 8, 2004

Related U.S. Application Data

(60) Provisional application No. 60/400,400, filed on Aug. 1, 2002.

(51) Int. Cl.$^7$ .............................. C08F 4/80; C07F 15/00; B01J 31/00
(52) U.S. Cl. ................. 526/171; 526/172; 526/348; 525/240; 502/155; 502/167; 548/101; 548/103; 556/136; 560/205; 564/161
(58) Field of Search .................... 502/155, 167; 548/101, 103; 556/136; 526/171, 172, 348; 560/205; 562/596; 564/161; 525/240

(56) References Cited

U.S. PATENT DOCUMENTS

| | | | |
|---|---|---|---|
| 5,312,940 A | 5/1994 | Grubbs et al. | |
| 5,342,909 A | 8/1994 | Grubbs et al. | |
| 5,831,108 A | 11/1998 | Grubbs et al. | |
| 5,969,170 A | 10/1999 | Grubbs et al. | |
| 6,080,826 A | * 6/2000 | Grubbs et al. | 526/75 |
| 6,111,121 A | * 8/2000 | Grubbs et al. | 556/21 |
| 6,211,391 B1 | * 4/2001 | Grubbs et al. | 556/21 |
| 6,310,121 B1 | * 10/2001 | Woodson et al. | 524/32 |
| 6,506,860 B1 | * 1/2003 | Bansleben et al. | 526/171 |
| 6,610,626 B2 | * 8/2003 | Grubbs et al. | 502/155 |
| 6,794,534 B2 | * 9/2004 | Grubbs et al. | 560/205 |
| 6,803,429 B2 | * 10/2004 | Morgan et al. | 526/135 |
| 6,838,489 B2 | * 1/2005 | Bell et al. | 522/63 |
| 6,844,409 B2 | * 1/2005 | Angeletakis et al. | 526/279 |

OTHER PUBLICATIONS

Bielawski et al. (2000), "Highly Efficient Ring–Opening Metathesis Polymerization (ROMP) Using New Ruthenium Catalysts Containing N–Heterocyclic Carbene Ligands," *Angew. Chem. Int. Ed.* 39(16):2903–2906.

Bourissou et al. (2000), "Stable Carbenes," *Chem. Rev.* 100(1):39–91.

Chatterjee et al. (2000), "Synthesis of Functionalized Olefins by Cross and Ring–Closing Metatheses," *J. Am. Chem. Soc.* 122(15):3783–3784.

(Continued)

*Primary Examiner*—Robert D. Harlan
(74) *Attorney, Agent, or Firm*—Dianne E. Reed; Reed Intellectual Property Law Group

(57) ABSTRACT

A method for synthesizing cyclic polymers using transition metal alkylidene complexes as reaction catalysts is provided, wherein the complexes contain a cyclic group. Polymerization is carried out on the catalyst, using cyclic olefin monomers that undergo ring insertion polymerization, and no linear intermediates are generated. Following completion of polymerization, the cyclic polymer detaches from the complex via an intramolecular chain transfer reaction and the catalytic complex is regenerated. The invention also provides novel transition metal alkylidene complexes useful as catalysts in the aforementioned process, as well as novel cyclic hydrocarbons.

22 Claims, 8 Drawing Sheets

OTHER PUBLICATIONS

Höcker et al. (1977), "The Thermal Behavior of Cycloalkanes," *Makromol. Chem.* 178:3101–3108.

Huang et al. (1999), "Olefin Metathesis–Active Ruthenium Complexes Bearing a Nucleophilic Carbene Ligand," *J. Am. Chem. Soc.* 121:(12):2674–2678.

Lee et al. (2002), "Retention Behavior of Linear and Ring Polystyrene at the Chromatographic Critical Condition," *Macromolecules* 35:529–538.

Shea et al. (1998), "A New Strategy for the Synthesis of Macrocycles. The Polyhomologation of Boracyclanes," *J. Org. Chem.* 63(17):5746.

Scholl et al. (1999), "Increased Ring Closing Metathesis Activity of Ruthenium–Based Olefin Metathesis Catalysts Coordinated with Imidazolin–2–ylidene Ligands," *Tetrahedron Letters* 40:2247–2250.

Scholl et al. (1999), "Synthesis and Activity of a New Generation of Ruthenium–Based Olefin Metathesis Catalysts Coordinated with 1,3–Dimesityl–4,5–dihydroimidazol–2–ylidene Ligands," *Organic Letters* 1(6):953–956.

Trnka et al. (2001), "The Development of $L_2X_2Ru=CHR$ Olefin Metathesis Catalysts: An Organometallic Success Story," *Accounts of Chemical Research* 34(1):18–29.

* cited by examiner

SYNTHESIS OF MACROCYCLIC POLYMERS BY RING INSERTION POLYMERIZATION OF CYCLIC OLEFIN MONOMERS

CROSS-REFERENCE TO RELATED APPLICATIONS

This application claims priority under 35 U.S.C. §119(e)(1) to Provisional U.S. Patent Application Ser. No. 60/400,400, filed Aug. 1, 2002, the disclosure of which is incorporated by reference herein in its entirety.

ACKNOWLEDGEMENT OF GOVERNMENT SUPPORT

The U.S. Government has certain rights in this invention pursuant to Grant No. CHE011946 awarded by the National Science Foundation.

TECHNICAL FIELD

This invention relates generally to the synthesis of cyclic polymers, and more particularly to the synthesis of cyclic polymers via ring-opening metathesis polymerization (ROMP) reactions using a Group 8 transition metal complex as the metathesis catalyst. Cyclic polymers provided herein have a variety of uses in the pharmaceutical, biomedical, organic synthesis and chemical industries.

BACKGROUND

At a yearly production rate of over 40 million tons, polyethylene remains one of the most valuable synthetic polymers in the world. It has found application in products ranging from grocery bags and milk containers to high performance fibers and medical devices. Its versatility stems from our ability to tune the material's crystallinity, mechanical strength, and thermal stability by altering the architecture of the individual polymer chains. However, the rising number of applications for polyethylene demands its material properties to be broadened even further.

Most efforts directed to altering the physical properties of polyethylene and other polymers have focused on methods for increasing the structural complexity of the polymer rather than on making more simple topological modifications that could be quite significant. For example, cyclization of a linear precursor to form a cyclic polymer conceptually varies the structure only minimally, but the physical properties of a macrocycle would be expected to differ markedly from the linear counterpart as a result of the restriction on conformational freedom and overall dimensions. For example, cyclic polymers are less viscous, exhibit higher glass transition temperatures, and have smaller hydrodynamic volumes and radii ($R_g$) than their respective linear analogues. See Semlyen, *Cyclic Polymers* (Kluwer Academic, Dordrecht, The Netherlands, ed. 2, 2000).

Although cyclic polymers have been previously synthesized, access to high molecular weight material (MW>100 kDa), which is often required for many polymers to show their characteristic physical properties, has been extraordinarily difficult. Ibid. The typical synthetic route involves preparation of linear polymeric precursors that contain reactive end groups, followed by intramolecular coupling under highly dilute conditions. Alternatively, the balance between linear and cyclic products that occurs with many types of polymerization reactions (e.g. polycondensations, metathesis polymerizations, etc.) may be shifted to maximize formation of cyclic product (which again generally involves using low concentrations). Incomplete cyclizations or undesired side reactions are common for both approaches and therefore elaborate purification procedures are often required to remove the acyclic contaminants. See Lee et al. (2002) *Macromolecules* 35:529. Furthermore, many monomers, including ethylene, are not amenable to these types of polymerizations. As a result, there are very few reported examples of cyclic polyethylenes, especially in the high molecular weight (MW>10⁴ Da) regime. See Höcker et al. (1977) *Makromol. Chem.* 178:3101 and Shea et al. (1998) *J. Org. Chem.* 63:5746.

Accordingly, there is a need in the art for an improved technique to prepare macrocyclic polymers. An ideal process would not involve linear intermediates, but proceed by way of a growing cyclic structure into which cyclic olefin monomers are successively inserted. In addition, an ideal method for synthesizing macrocyclic polymers would result in an easily isolable and stable structure without incorporation of undesired substituents or functional groups. The present invention is directed to the aforementioned need in the art, and makes use of Group 8 transition metal alkylidene complexes as polymerization catalysts of such a polymerization reaction.

Transition metal alkylidene complexes, particularly ruthenium and osmium complexes, have been described in U.S. Pat. Nos. 5,312,940, 5,342,909, 5,831,108, 5,969,170, 6,111,121, and 6,211,391 to Grubbs et al., assigned to the California Institute of Technology. The complexes disclosed in these patents all possess metal centers that are formally in the +2 oxidation state, have an electron count of 16, and are penta-coordinated. These catalysts are of the general formula XX'M(LL')=CRR' wherein M is a Group 8 transition metal such as ruthenium or osmium, X and X' are anionic ligands, L and L' are neutral electron donors, and R and R' are specific substituents, e.g., one may be H and the other may be a substituted or unsubstituted hydrocarbyl group such as phenyl or C=C(CH$_3$)$_2$. Such metathesis catalysts include those that have been prepared with phosphine ligands, e.g., triphenylphosphine or dimethylphenylphospine, exemplified by phenylmethylene-bis(tricyclohexylphosphine)ruthenium dichloride

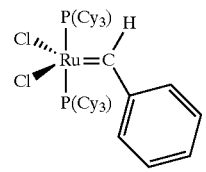

wherein "Cy" is cyclohexyl. See U.S. Pat. No. 5,917,071 to Grubbs et al. and Trnka and Grubbs (2001), cited supra. These compounds are highly reactive catalysts useful for catalyzing a variety of olefin metathesis reactions.

More recently, significant interest has focused on such transition metal alkylidene catalysts wherein one of the phosphine ligands is replaced with an N-heterocyclic carbene ligand. See, e.g., Trnka and Grubbs, supra; Bourissou et al. (2000) *Chem. Rev.* 100:39–91; Scholl et al. (1999) *Tetrahedron Lett.* 40:2247–2250; Scholl et al. (1999) *Organic Lett.* 1(6):953–956; and Huang et al. (1999) *J. Am. Chem. Soc.* 121:2674–2678. N-heterocyclic carbene ligands offer many advantages, including readily tunable steric bulk, vastly increased electron donor character, compatibility with a variety of metal species, and improved thermal stability. See Scholl et al. (1999) *Tetrahedron Lett.* 40:2247–2250; Scholl et al. (1999) *Org. Lett.* 1:953–956; Chatterjee et al. (2000) *J. Am. Chem. Soc.* 122:3783–3784; and Bielawski et al. (2000) *Angew. Chem. Int. Ed.* 39:2903–2906, A representative of these second generation catalysts is the ruthenium complex (IMesH$_2$)(PCy$_3$)(Cl)$_2$Ru=CHPh

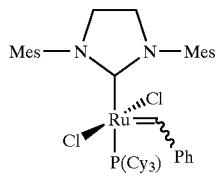

wherein Cy is cyclohexyl, Ph is phenyl, and Mes represents mesityl (2,4,6-trimethylphenyl).

As noted above, these complexes have been used to catalyze a variety of olefin metathesis reactions, including polymerization reactions. To date, however, there has been no disclosure of a method for efficiently synthesizing high molecular weight, stable, and readily isolable cyclic polymers. The invention now provides a method for synthesizing such cyclic polymers using a cyclic analog of the transition metal alkylidene complexes described above as a polymerization catalyst.

SUMMARY OF THE INVENTION

The present invention is addressed to the aforementioned needs in the art, and provides a method for using metal alkylidene complexes to catalyze a ring-insertion polymerization reaction that results in a macrocyclic polymer. The method involves combining, in a reaction mixture, a cyclic olefin monomer with a catalytically effective amount of a transition metal alkylidene complex containing a cyclic group of known size, whereby the cyclic olefin monomer successively inserts into the cyclic group to increase the size thereof in a stepwise manner without detachment of any linear species from the complex. That is, the cyclic polymer grows in cyclic form while attached to the catalytic complex, and the reaction does not involve generation of any linear intermediates. Following completion of polymerization on the transition metal alkylidene complex, the cyclic polymer is released from the complex by an intramolecular chain transfer reaction. The reaction is carried out in the liquid phase, and a solvent may, optionally, be added to the reaction mixture. Alternatively, the cyclic olefin monomer may itself serve as solvent. The cyclic polymer that results from the aforementioned reaction can be readily isolated by addition of a precipitating solvent to the reaction mixture. The precipitated cyclic polymer can then be isolated by filtration or other conventional means, and purification steps are generally unnecessary.

In another embodiment, certain transition metal alkylidene complexes are provided as novel compositions of matter. The complexes are useful as polymerization catalysts in the aforementioned polymerization reaction, and have the structure of formula (IX)

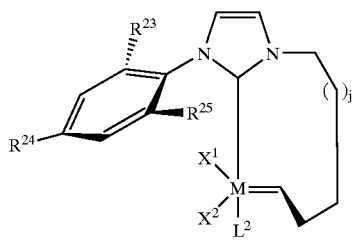

(IX)

wherein:
j is an integer in the range of 1 to 6 inclusive;
M is a Group 8 transition metal;
L$^2$ is a neutral electron donor ligand, and X$^1$ and X$^2$ are anionic ligands, wherein any two of L$^2$, X$^1$ and X$^2$ can be taken together to form a single bidentate ligand; and
R$^{23}$, R$^{24}$, and R$^{25}$ are lower alkyl.

Also provided as a new composition of matter is a cyclic hydrocarbon polymer substantially free of linear contaminants and having a number average molecular weight of at least about 150 kD. The polymer may be, for example, a cyclic polyoctenamer, cyclic polyethylene, cyclic polybutadiene, or the like. Generally, the polymer has a polydispersity index (PDI) of 2.3 or less. By "substantially free" of linear contaminants is meant that the polymer contains less than 0.5 mol %, preferably less than 0.1 mol. %, and most preferably less than 0.05 mol % of any linear contaminants.

In a further embodiment, the invention provides a polymer blend comprising such a cyclic hydrocarbon polymer and at least one second polymer selected to provide one or more desirable properties. Suitable second polymers include, without limitation, other polyolefins, e.g., polypropylene, polystyrene, substituted polystyrenes, acyclic polyethylenes including linear and branched polyethylenes, butyl rubber, polyisoprene, vinyl ether polymers, and the like.

DETAILED DESCRIPTION OF THE PREFERRED EMBODIMENTS

Figure 1A:
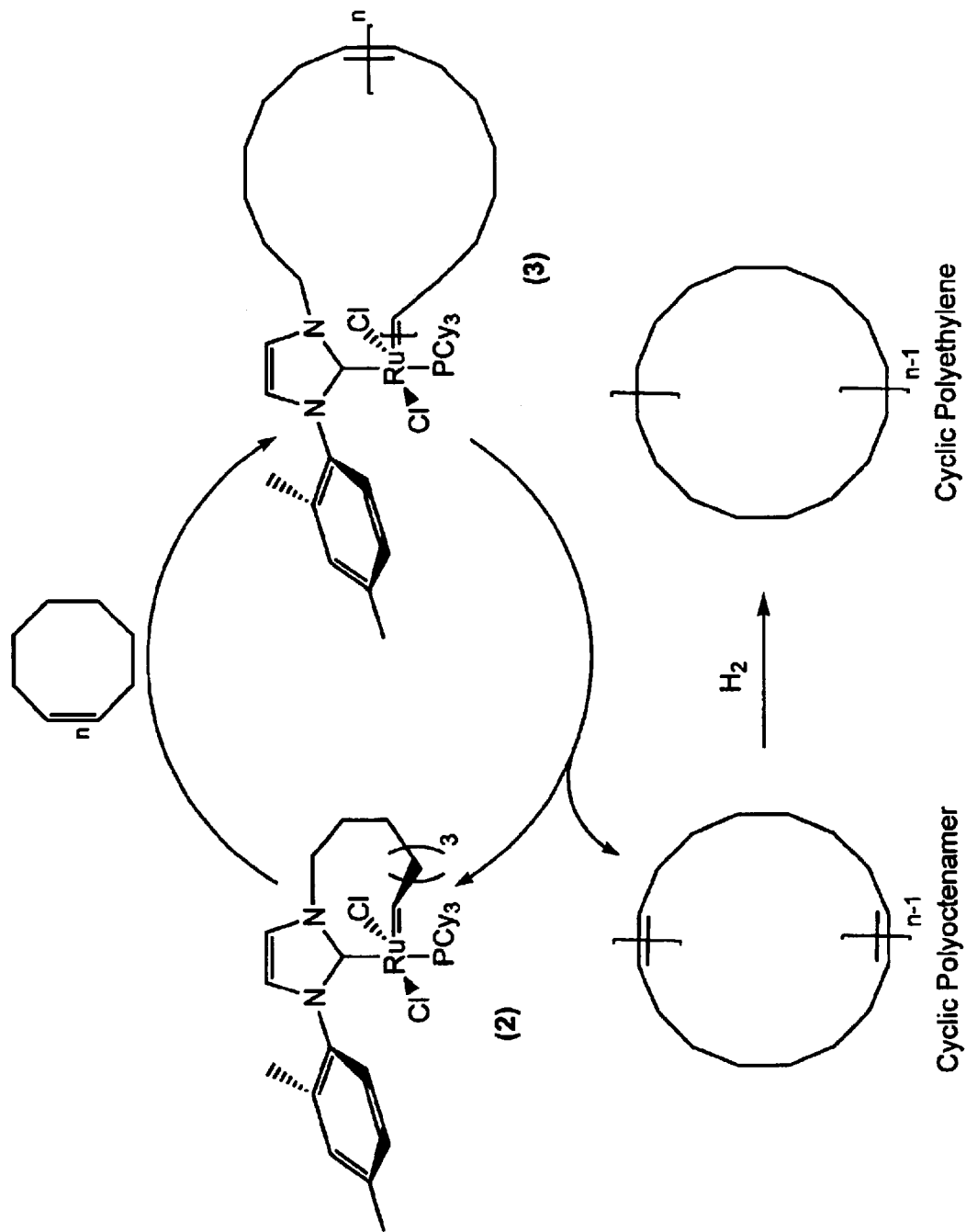
FIGS. 1A and 1B schematically illustrate the synthesis of cyclic polyoctenamers using ring-opening metathesis polymerization and linear polyoctenamers, respectively, as discussed in Examples 2 and 3.

Unless otherwise indicated, the invention is not limited to specific molecular structures, substituents, synthetic methods, reaction conditions, or the like, as such may vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "a monomer" includes a single monomer as well as two or more monomers that may be the same or different, reference to "a substituent" includes two or more substituents, and the like.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used. The term "independently selected from" is used herein to indicate that the recited elements, e.g., R groups or the like, can be identical or different.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "alkyl" as used herein refers to a branched or unbranched saturated hydrocarbon group typically although not necessarily containing 1 to about 20 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 18 carbon atoms, preferably 1 to about 12 carbon atoms. The term "lower alkyl" intends an alkyl group of 1 to 6 carbon atoms. "Substituted alkyl" refers to alkyl substituted with one or more substituent groups, and the terms "heteroatom-containing alkyl" and "heteroalkyl" refer to an alkyl substituent in which at least one carbon atom is replaced with a heteroatom, as described in further detail infra. If not otherwise indicated, the terms "alkyl" and "lower alkyl" include linear, branched, cyclic, unsubstituted, substituted, and/or heteroatom-containing alkyl or lower alkyl, respectively.

The term "alkylene" as used herein refers to a difunctional linear, branched, or cyclic alkyl group, where "alkyl" is as defined above.

The term "alkenyl" as used herein refers to a linear, branched or cyclic hydrocarbon group of 2 to about 20 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Generally, although again not necessarily, alkenyl groups herein contain 2 to about 18 carbon atoms, preferably 2 to 12 carbon atoms. The term "lower alkenyl" intends an alkenyl group of 2 to 6 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to 20 carbon atoms containing at least one triple bond, such as ethynyl, n-propynyl, and the like. Generally, although again not necessarily, alkynyl groups herein contain 2 to about 18 carbon atoms, preferably 2 to 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms, and includes, for example, methoxy, ethoxy, n-propoxy, isopropoxy, t-butyloxy, etc. Preferred substituents identified as "$C_1$–$C_6$ alkoxy" or "lower alkoxy" herein contain 1 to 3 carbon atoms, and particularly preferred such substituents contain 1 or 2 carbon atoms (i.e., methoxy and ethoxy).

The term "aryl" as used herein, and unless otherwise specified, refers to an aromatic substituent generally containing 5 to 30 carbon atoms and containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituent, in which at least one carbon atom is replaced with a heteroatom, as will be described in further detail infra. If not otherwise indicated, the term "aryl" includes unsubstituted, substituted, and/or heteroatom-containing aromatic substituents.

The term "aralkyl" refers to an alkyl group with an aryl substituent, and the term "alkaryl" refers to an aryl group with an alkyl substituent, wherein "alkyl" and "aryl" are as defined above. In general, aralkyl and alkaryl groups herein contain 6 to 24 carbon atoms, while preferred aralkyl and alkaryl groups contain 6 to 16 carbon atoms, and particularly preferred such groups contain 6 to 12 carbon atoms. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-dienyl, and the like.

The terms "halo," "halide," and "halogen" are used in the conventional sense to refer to a chloro, bromo, fluoro, or iodo substituent. The terms "haloalkyl," "haloalkenyl," and "haloalkynyl" (or "halogenated alkyl," "halogenated alkenyl," and "halogenated alkynyl") refer to an alkyl, alkenyl, or alkynyl group, respectively, in which at least one of the hydrogen atoms in the group has been replaced with a halogen atom.

The term "cyclic" refers to alicyclic or aromatic substituents that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The term "heteroatom-containing" as in a "heteroatom-containing alkyl group" (also termed a "heteroalkyl" group) or a "heteroatom-containing aryl group" (also termed a "heteroaryl" group) refers to a molecule, linkage or substituent in which one or more carbon atoms are replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

Unless otherwise indicated, the term "hydrocarbyl" is to be interpreted as including substituted and/or heteroatom-containing hydrocarbyl moieties. "Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" intends a divalent hydrocarbyl moiety containing 1 to about 30 carbon atoms, preferably 1 to about 24 carbon atoms, most preferably 3 to about 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to elsewhere herein as "Fn," such as halo, hydroxyl, sulfhydryl, $C_1$–$C_{20}$ alkoxy, $C_2$–$C_{20}$ alkenyloxy, $C_2$–$C_{20}$ alkynyloxy, $C_5$–$C_{24}$ aryloxy, acyl (including $C_2$–$C_{20}$ alkylcarbonyl (—CO-alkyl) and $C_6$–$C_{24}$ arylcarbonyl (—CO-aryl)), acyloxy (—O-acyl), $C_2$–$C_{20}$ alkoxycarbonyl (—(CO)—O-alkyl), $C_6$–$C_{24}$ aryloxycarbonyl (—(CO)—O-aryl), halocarbonyl (—CO)—X where X is halo, $C_2$–$C_{20}$ alkylcarbonato (—O—(CO)—O-alkyl), $C_6$–$C_{24}$ arylcarbonato (—O—(CO)—O-aryl), carboxy (—COOH), carboxylato (—COO$^-$), carbamoyl (—(CO)—NH$_2$), mono-substituted $C_1$–$C_{24}$ alkylcarbamoyl (—(CO)—NH($C_1$–$C_{20}$ alkyl)), di-substituted alkylcarbamoyl (—(CO)—N($C_1$–$C_{20}$ alkyl)$_2$), mono-substituted arylcarbamoyl (—(CO)—NH-aryl), thiocarbamoyl (—(CS)—NH$_2$), carbamido (—NH—(CO)—NH$_2$), cyano (—C≡N), isocyano (—N$^+$≡C$^-$), cyanato (—O—C≡N), isocyanato (—O—N$^+$≡C$^-$), isothiocyanato (—S—C≡N), azido (—N=N$^+$=N$^-$), formyl (—(CO)—H), thioformyl (—(CS)—H), amino (—NH$_2$), mono- and di-($C_1$–$C_{20}$ alkyl)-substituted amino, mono- and di-($C_5$–$C_{24}$ aryl)-substituted amino, $C_2$–$C_{20}$ alkylamido (—NH—(CO)-alkyl), $C_5$–$C_{24}$ arylamido (—NH—(CO)-aryl), imino (—CR=NH where R=hydrogen, $C_1$–$C_{20}$ alkyl, $C_5$–$C_{24}$ aryl, $C_6$–$C_{24}$ alkaryl, $C_6$–$C_{24}$ aralkyl, etc.), alkylimino (—CR=N(alkyl), where R=hydrogen, alkyl, aryl, alkaryl, etc.), arylimino (—CR=N (aryl), where R=hydrogen, alkyl, aryl, alkaryl, etc.), nitro (—NO$_2$), nitroso (—NO), sulfo (—SO$_2$—OH), sulfonato (—SO$_2$—O$^{31}$), $C_1$–$C_{20}$ alkylsulfanyl (—S-alkyl; also termed "alkylthio"), arylsulfanyl (—S-aryl; also termed "arylthio"), $C_1$–$C_{20}$ alkylsulfinyl (—(SO)-alkyl), $C_5$–$C_{24}$ arylsulfinyl (—(SO)-aryl), $C_1$–$C_{20}$ alkylsulfonyl (—SO$_2$-alkyl), $C_5$–$C_{24}$ arylsulfonyl (—SO$_2$-aryl), phosphono (—P(O)(OH)$_2$), phosphonato (—P(O)(O$^-$)$_2$), phosphinato (—P(O)(O$^-$)), phospho (—PO$_2$), and phosphino (—PH$_2$); and the hydrocarbyl moieties $C_1$–$C_{20}$ alkyl (preferably $C_1$–$C_{18}$ alkyl, more preferably $C_1$–$C_{12}$ alkyl, most preferably $C_1$–$C_6$ alkyl), $C_2$–$C_{20}$ alkenyl (preferably $C_2$–$C_{18}$ alkenyl, more preferably $C_2$–$C_{12}$ alkenyl, most preferably $C_2$–$C_6$ alkenyl), $C_2$–$C_{20}$ alkynyl (preferably $C_2$–$C_{18}$ alkynyl, more preferably $C_2$–$C_{12}$ alkynyl, most preferably $C_2$–$C_6$ alkynyl), $C_5$–$C_{24}$ aryl (preferably $C_5$–$C_{14}$ aryl), and $C_6$–$C_{24}$ aralkyl (preferably $C_6$–$C_{16}$ aralkyl). In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

The term "polymer" includes homopolymers as well as copolymers, terpolymers, and the like, and copolymers herein include block copolymers, alternating copolymers, and random copolymers.

When the term "substituted" appears prior to a list of possible substituted groups, it is intended that the term apply to every member of that group. For example, the phrase "substituted alkyl and aryl" is to be interpreted as "substituted alkyl and aryl."

In the molecular structures herein, the use of bold and dashed lines to denote particular conformation of groups follows the IUPAC convention. A bond indicated by a broken line indicates that the group in question is below the general plane of the molecule as drawn (the "α" configuration), and a bond indicated by a bold line indicates that the group at the position in question is above the general plane of the molecule as drawn (the "β" configuration).

Accordingly, the invention provides a method for carrying out a ring-opening metathesis polymerization reaction in which the ends of the growing polymer chains remain attached to an organometallic catalyst throughout the entire polymerization process. The catalyst is a Group 8 transition metal alkylidene complex having the structure of formula (I)

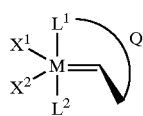

(I)

in which the various substituents are as follows.

M, which serves as the transition metal center in the +2 oxidation state, is a Group 8 transition metal, particularly ruthenium or osmium. In a particularly preferred embodiment, M is ruthenium.

$X^1$ and $X^2$ are discrete anionic ligands, and may be the same or different, or are linked together to form a cyclic group and thus a bidentate ligand, typically although not necessarily a five- to eight-membered ring. In preferred embodiments, $X^1$ and $X^2$ are each independently hydrogen, halide, or one of the following groups: $C_1$–$C_{20}$ alkyl, $C_5$–$C_{24}$ aryl, $C_1$–$C_{20}$ alkoxy, $C_5$–$C_{24}$ aryloxy, $C_2$–$C_{20}$ alkoxycarbonyl, $C_6$–$C_{24}$ aryloxycarbonyl, $C_2$–$C_{24}$ acyl, $C_2$–$C_{24}$ acyloxy, $C_1$–$C_{20}$ alkylsulfonato, $C_5$–$C_{24}$ arylsulfonato, $C_1$–$C_{20}$ alkylsulfanyl, $C_5$–$C_{24}$ arylsulfanyl, $C_1$–$C_{20}$ alkylsulfinyl, or $C_5$–$C_{24}$ arylsulfinyl. Optionally, $X^1$ and $X^2$ may be substituted with one or more moieties selected from $C_1$–$C_{12}$ alkyl, $C_1$–$C_{12}$ alkoxy, $C_5$–$C_{24}$ aryl, and halide, which may, in turn, with the exception of halide, be further substituted with one or more groups selected from halide, $C_1$–$C_6$ alkyl, $C_1$–$C_6$ alkoxy, and phenyl. In more preferred embodiments, $X^1$ and $X^2$ are halide, benzoate, $C_2$–$C_6$ acyl, $C_2$–$C_6$ alkoxycarbonyl, $C_1$–$C_6$ alkyl, phenoxy, $C_1$–$C_6$ alkoxy, $C_1$–$C_6$ alkylsulfanyl, aryl, or $C_1$–$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

$L^1$ and $L^2$ are neutral electron donor ligands, and, as illustrated in formula (I), an atom within $L^1$ is indirectly linked to the alkylidene functionality through a linkage Q, wherein Q contains at least 1, preferably at least 2, and most preferably at least 4 spacer atoms in the chain. Q is a hydrocarbylene (e.g., $C_1$–$C_{20}$ alkylene, $C_2$–$C_{20}$ alkenylene, $C_2$–$C_{20}$ alkynylene, $C_5$–$C_{24}$ arylene, $C_6$–$C_{24}$ alkarylene, or $C_6$–$C_{24}$ aralkylene), substituted hydrocarbylene (e.g., substituted $C_1$–$C_{20}$ alkylene, $C_2$–$C_{20}$ alkenylene, $C_2$–$C_{20}$ alkynylene, $C_5$–$C_{24}$ arylene, $C_6$–$C_{24}$ alkarylene, or $C_6$–$C_{24}$ aralkylene), heteroatom-containing hydrocarbylene (e.g., $C_1$–$C_{20}$ heteroalkylene, $C_2$–$C_{20}$ heteroalkenylene, $C_2$–$C_{20}$ heteroalkynylene, $C_5$–$C_{24}$ heteroarylene, heteroatom-containing $C_6$–$C_{24}$ aralkylene, or heteroatom-containing $C_6$–$C_{24}$ alkarylene), or substituted heteroatom-containing hydrocarbylene (e.g., substituted $C_1$–$C_{20}$ heteroalkylene, substituted $C_2$–$C_{20}$ heteroalkenylene, substituted $C_2$–$C_{20}$ heteroalkynylene, substituted $C_5$–$C_{24}$ heteroarylene, substituted heteroatom-containing $C_6$–$C_{24}$ aralkylene, or substituted heteroatom-containing $C_6$–$C_{24}$ alkarylene). Preferred Q linkages are $C_2$–$C_{18}$ alkylene and $C_2$–$C_{18}$ alkenylene, preferably $C_2$–$C_{12}$ alkylene and $C_2$–$C_{12}$ alkenylene.

Typically, although not necessarily, $L^1$ is a strongly coordinating neutral electron donor ligand, as will be discussed in detail infra, and $L^2$ is a more weakly coordinating electron donor ligand, e.g., phosphine, sulfonated phosphine, phosphite, phosphinite, phosphonite, arsine, stibine, ether (including cyclic ether), thioether (including cyclic thioether), amine, amide, imine, sulfoxide, carboxyl, nitrosyl, and optionally substituted heterocyclic groups. The latter $L^2$ moieties are generally five- or six-membered monocyclic groups containing 1 to 4, preferably 1 to 3, most preferably 1 to 2 heteroatoms. If the heterocyclic group is substituted, it should not be substituted on a coordinating heteroatom, and any one cyclic moiety within a heterocyclic group will generally not be substituted with more than 3 substituents. Examples of such $L^2$ groups include, without limitation:

nitrogen-containing heterocycles such as pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole;

sulfur-containing heterocycles such as thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene;

oxygen-containing heterocycles such as 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran; and mixed heterocycles such as isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred heterocyclic $L^2$ ligands are aromatic nitrogen-containing and oxygen-containing heterocycles, and particularly preferred heterocyclic $L^2$ ligands are monocyclic N-heteroaryl ligands that are optionally substituted with 1 to 3, preferably 1 or 2, substituents. Specific examples of particularly preferred heterocyclic $L^2$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on heterocyclic $L^2$ ligands are selected from halo, $C_1$–$C_{20}$ alkyl, substituted $C_1$–$C_{20}$ alkyl, $C_1$–$C_{20}$ heteroalkyl, substituted $C_1$–$C_{20}$ heteroalkyl, $C_5$–$C_{24}$ aryl, substituted $C_5$–$C_{24}$ aryl, $C_5$–$C_{24}$ heteroaryl, substituted $C_5$–$C_{24}$ heteroaryl, $C_6$–$C_{24}$ alkaryl, substituted $C_6$–$C_{24}$ alkaryl, $C_6$–$C_{24}$ heteroalkaryl, substituted $C_6$–$C_{24}$ heteroalkaryl, $C_6$–$C_{24}$ aralkyl, substituted $C_6$–$C_{24}$ aralkyl, $C_6$–$C_{24}$ heteroaralkyl, substituted $C_6$–$C_{24}$ heteroaralkyl, and functional groups, with suitable functional groups including, without limitation, $C_1$–$C_{20}$ alkoxy, $C_5$–$C_{24}$ aryloxy, $C_2$–$C_{20}$ alkylcarbonyl, $C_6$–$C_{24}$ arylcarbonyl, $C_2$–$C_{20}$ alkylcarbonyloxy, $C_6$–$C_{24}$ arylcarbonyloxy, $C_2$–$C_{20}$ alkoxycarbonyl, $C_6$–$C_{24}$ aryloxycarbonyl, halocarbonyl, $C_2$–$C_{20}$ alkylcarbonato, $C_6$–$C_{24}$ arylcarbonato, carboxy, carboxylato, carbamoyl, mono-($C_1$–$C_{20}$ alkyl)-substituted carbamoyl, di-($C_1$–$C_{20}$ alkyl)-substituted carbamoyl, di-N—($C_1$–$C_{20}$ alkyl), N—($C_5$–$C_{24}$ aryl)-substituted carbamoyl, mono-($C_5$–$C_{24}$ aryl)-substituted carbamoyl, di-($C_6$–$C_{24}$ aryl)-substituted carbamoyl, thiocarbamoyl, mono-($C_1$–$C_{20}$ alkyl)-substituted thiocarbamoyl, di-($C_1$–$C_{20}$ alkyl)-substituted thiocarbamoyl, di-N—($C_1$–$C_{20}$ alkyl)-N—($C_6$–$C_{24}$ aryl)-substituted thiocarbamoyl, mono-($C_6$–$C_{24}$ aryl)-substituted thiocarbamoyl, di-($C_6$–$C_{24}$ aryl)-substituted thiocarbamoyl, carbamido, formyl, thioformyl, amino, mono-($C_1$–$C_{20}$ alkyl)-substituted amino, di-($C_1$–$C_{20}$ alkyl)-substituted amino, mono-($C_5$–$C_{24}$ aryl)-substituted amino, di-($C_5$–$C_{24}$ aryl)-substituted amino, di-N—($C_1$–$C_{20}$ alkyl),N—($C_5$–$C_{24}$ aryl)-substituted amino, $C_2$–$C_{20}$ alkylamido, $C_6$–$C_{24}$arylamido, imino, $C_1$–$C_{20}$ alkylimino, $C_5$–$C_{24}$arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on heterocyclic $L^2$ ligands include, without limitation, halo, $C_1$–$C_{12}$ alkyl, substituted $C_1$–$C_{12}$ alkyl, $C_1$–$C_{12}$ heteroalkyl, substituted $C_1$–$C_{12}$ heteroalkyl, $C_5$–$C_{14}$ aryl, substituted $C_5$–$C_{14}$ aryl, $C_5$–$C_{14}$ heteroaryl, substituted $C_5$–$C_{14}$ heteroaryl, $C_6$–$C_{16}$ alkaryl, substituted $C_6$–$C_{16}$ alkaryl, $C_6$–$C_{16}$ heteroalkaryl, substituted $C_6$–$C_{16}$ heteroalkaryl, $C_6$–$C_{16}$ aralkyl, substituted $C_6$–$C_{16}$ aralkyl, $C_6$–$C_{16}$ heteroaralkyl, substituted $C_6$–$C_{16}$ heteroaralkyl, $C_1$–$C_{12}$ alkoxy, $C_5$–$C_{14}$ aryloxy, $C_2$–$C_{12}$ alkylcarbonyl, $C_6$–$C_{14}$ arylcarbonyl, $C_2$–$C_{12}$ alkylcarbonyloxy, $C_6$–$C_{14}$ arylcarbonyloxy, $C_2$–$C_{12}$ alkoxycarbonyl, $C_6$–$C_{14}$ aryloxycarbonyl, halocarbonyl, formyl, amino, mono-($C_1$–$C_{12}$ alkyl)-substituted amino, di-($C_1$–$C_{12}$ alkyl)-substituted amino, mono-($C_5$–$C_{14}$ aryl)-substituted amino, di-($C_5$–$C_{14}$ aryl)-substituted amino, and nitro.

Of the foregoing, the most preferred substituents are halo, $C_1$–$C_6$ alkyl, $C_1$–$C_6$ haloalkyl, $C_1$–$C_6$ alkoxy, phenyl, substituted phenyl, formyl, N,N-di$C_1$–$C_6$ alkyl)amino, nitro, and nitrogen heterocycles as described above (including, for example, pyrrolidine, piperidine, piperazine, pyrazine, pyrimidine, pyridine, pyridazine, etc.).

In a still more preferred embodiment, $L^2$ is a phosphine of the formula $PR^1R^2R^3$, where $R^1$, $R^2$, and $R^3$ are each independently aryl or $C_1$–$C_{10}$ alkyl, particularly primary alkyl, secondary alkyl, or cycloalkyl. In the most preferred embodiments, $L^2$ is tricyclohexylphosphine, tricyclopentylphosphine, triisopropylphosphine, triphenylphosphine, diphenylmethylphosphine, or phenyldimethylphosphine, with tricyclohexylphosphine and tricyclopentylphosphine particularly preferred.

Any two or more (typically two, three, or four) of $X^1$, $X^2$, $L^1$, $L^2$, $L^3$, $R^1$, and $R^2$ can be taken together to form a cyclic group, as disclosed, for example, in U.S. Pat. No. 5,312,940 to Grubbs et al. When any of $X^1$, $X^2$, $L^1$, $L^2$, $L^3$, $R^1$, and $R^2$ are linked to form cyclic groups, those cyclic groups may be five- or six-membered rings, or may comprise two or three five- or six-membered rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

In preferred catalysts, $L^1$ is a carbene ligand having the structure of formula (II)

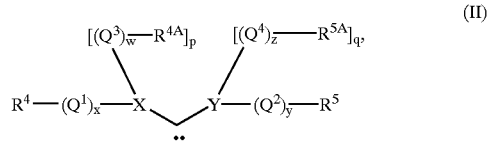

wherein an atom within $L^1$ is indirectly linked to the alkylidene moiety through a linkage Q, as shown in Formula (I). In Formula (II):

X and Y are heteroatoms typically selected from N, O, S, and P. Since O and S are divalent, p is necessarily zero when X is O or S, and q is necessarily zero when Y is O or S. However, when X is N or P, then p is 1, and when Y is N or P, then q is 1. In a preferred embodiment, both X and Y are N.

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within Q may be linked to form an additional cyclic group.

$R^4$, $R^{4A}$, $R^5$, and $R^{5A}$ are independently selected from hydrogen, hydrocarbyl, substituted hydrocarbyl, heteroatom-containing hydrocarbyl, and substituted heteroatom-containing hydrocarbyl.

In addition to the cyclic group formed by the linkage Q, additional cyclic groups may be present in the catalyst when any two or more of $X^1$, $X^2$, $L^2$, $R^4$, $R^{4A}$, $R^5$, and $R^{5A}$ are linked as disclosed, for example, in U.S. Pat. No. 5,312,940 to Grubbs et al. When any of $X^1$, $X^2$, $L^2$, $R^4$, $R^{4A}$, $R^5$, and $R^{5A}$ are linked to form cyclic groups, those cyclic groups may be five- or six-membered rings, or may comprise two or three five- or six-membered rings, which may be either fused or linked. The cyclic groups may be aliphatic or aromatic, and may be heteroatom-containing and/or substituted, as explained in part (I) of this section. The cyclic group may, in some cases, form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$—, —As(Ph)$_2$ CH$_2$CH$_2$As (Ph$_2$)—, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$ CH$_2$CH$_2$P(Ph)$_2$—and —P(CH$_3$)$_2$(CH$_2$)$_2$P (CH$_3$)$_2$—. Tridentate ligands include, but are not limited to, (CH$_3$)$_2$ NCH$_2$CH$_2$P(Ph)CH$_2$CH$_2$N(CH$_3$)$_2$. Other preferred tridentate ligands are those in which any three of $X^1$, $X^2$, $L^1$, $L^2$, $R^1$, and $R^2$ (e.g., $X^1$, $L^1$, and $L^2$) are taken together to be cyclopentadienyl, indenyl, or fluorenyl, each optionally substituted with $C_2$–$C_{20}$ alkenyl, $C_2$–$C_{20}$ alkynyl, $C_1$–$C_{20}$ alkyl, $C_5$–$C_{20}$ aryl, $C_1$–$C_{20}$ alkoxy, $C_2$–$C_{20}$ alkenyloxy, $C_2$–$C_{20}$ alkynyloxy, $C_5$–$C_{20}$ aryloxy, $C_2$–$C_{20}$ alkoxycarbonyl, $C_1$–$C_{20}$ alkylthio, $C_1$–$C_{20}$ alkylsulfonyl, or $C_1$–$C_{20}$ alkylsulfinyl, each of which may be further substituted with $C_1$–$C_6$ alkyl, halide, $C_1$–$C_6$ alkoxy or with a phenyl group optionally substituted with halide, $C_1$–$C_6$ alkyl, or $C_1$–$C_6$ alkoxy. More preferably, in compounds of this type, X, $L^1$, and $L^2$ are taken together to be cyclopentadienyl or indenyl, each optionally substituted with vinyl, $C_1$–$C_{10}$ alkyl, $C_5$–$C_{20}$ aryl, $C_1$–$C_{10}$ carboxylate, $C_2$–$C_{10}$ alkoxycarbonyl, $C_1$–$C_{10}$ alkoxy, or $C_5$–$C_{20}$ aryloxy, each optionally substituted with $C_1$–$C_6$ alkyl, halide, $C_1$–$C_6$ alkoxy or with a phenyl group optionally substituted with halide, $C_1$–$C_6$ alkyl or $C_1$–$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to $O_2C(CH_2)_2P(Ph)(CH_2)_2P(Ph)(CH_2)_2CO_2$, phthalocyanines, and porphyrins.

Also, any one or more of $X^1$, $X^2$, $L^2$, $R^4$, $R^{4A}$, $R^5$, and $R^{5A}$ may be directly or indirectly attached to a support.

Preferably, $R^{4A}$ and $R^{5A}$ are linked to form a cyclic group so that the carbene ligand has the structure of formula (III)

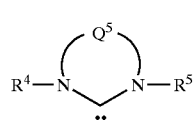

(III)

wherein $R^4$ and $R^5$ are defined above, with preferably at least one of $R^4$ and $R^5$, and more preferably both $R^4$ and $R^5$, being alicyclic or aromatic of one to about five rings, and optionally containing one or more heteroatoms and/or substituents. $Q^5$ is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within $Q^5$ may also be linked to form an additional cyclic structure, which may be similarly substituted to provide a fused polycyclic structure of two to about five cyclic groups.

Preferred transition metal complexes containing neutral electron donor ligand (II) as $L^1$ have the structure of Formula (IV), while preferred transition metal complexes containing neutral electron donor ligand (III) as $L^1$ have the structure of Formula (V):

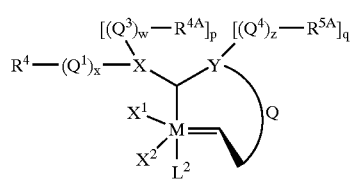

(IV)

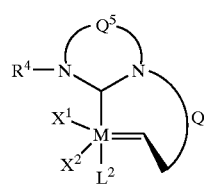

(V)

In a more preferred embodiment, $Q^5$ is a two-atom linkage having the structure —$CR^{19}R^{20}$—$CR^{21}R^{22}$— or —$CR^{19}$=$CR^{21}$—, preferably the latter, such that the complex has the structure of formula (VI) or (VII), respectively

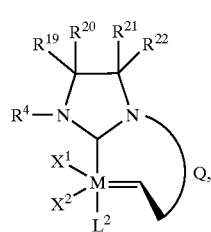

(VI)

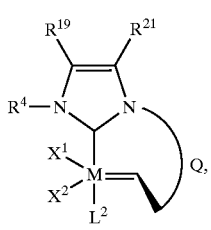

(VII)

wherein $R^{19}$, $R^{20}$, $R^{21}$, and $R^{22}$ are independently selected from hydrogen, hydrocarbyl, substituted hydrocarbyl, heteroatom-containing hydrocarbyl, substituted heteroatom-containing hydrocarbyl, and functional groups as defined earlier herein. Examples of functional groups here include carboxyl, $C_1$–$C_{20}$ alkoxy, $C_5$–$C_{20}$ aryloxy, $C_2$–$C_{20}$ alkoxycarbonyl, $C_2$–$C_{20}$ alkoxycarbonyl, $C_2$–$C_{20}$ acyloxy, $C_1$–$C_{20}$ alkylthio, $C_5$–$C_{20}$ arylthio, $C_1$–$C_{20}$ alkylsulfonyl, and $C_1$–$C_{20}$ alkylsulfinyl, optionally substituted with one or more moieties selected from $C_1$–$C_{10}$ alkyl, $C_1$–$C_{10}$ alkoxy, $C_5$–$C_{20}$ aryl, hydroxyl, sulfhydryl, formyl, and halide. Alternatively, any two of $R^{19}$, $R^{20}$, $R^{21}$, and $R^{22}$ may be linked together to form a substituted or unsubstituted, saturated or unsaturated ring structure, e.g., a $C_4$–$C_{12}$ alicyclic group or a $C_5$ or $C_6$ aryl group, which may itself be substituted, e.g., with linked or fused alicyclic or aromatic groups, or with other substituents.

When $R^4$ is aromatic, it is typically although not necessarily composed of one or two aromatic rings, which may or may not be substituted, e.g., $R^4$ may be phenyl, substituted phenyl, biphenyl, substituted biphenyl, or the like. In one preferred embodiment, $R^4$ has the structure (VIII)

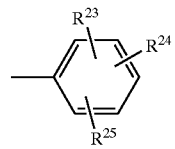

(VIII)

in which $R^{23}$, $R^{24}$, and $R^{25}$ are each independently hydrogen, $C_1$–$C_{20}$ alkyl, substituted $C_1$–$C_{20}$ alkyl, $C_1$–$C_{20}$ heteroalkyl, substituted $C_1$–$C_{20}$ heteroalkyl, $C_5$–$C_{20}$ aryl, substituted $C_5$–$C_{20}$ aryl, $C_5$–$C_{20}$ heteroaryl, $C_5$–$C_{30}$ aralkyl, $C_5$–$C_{30}$ alkaryl, or halide. Preferably, $R^{23}$, $R^{24}$, and $R^{25}$ are each independently hydrogen, $C_1$–$C_{10}$ alkyl, $C_1$–$C_{10}$ alkoxy, $C_5$–$C_{14}$ aryl, substituted $C_5$–$C_{14}$ aryl, or halide. More preferably, $R^4$ is mesityl, diisopinocamphenyl, or 2,4,2',6'-tetramethylbiphenylyl, and most preferably, $R^4$ is mesityl.

It will therefore be appreciated that a preferred, representative catalyst of the invention has the structure of formula (IX)

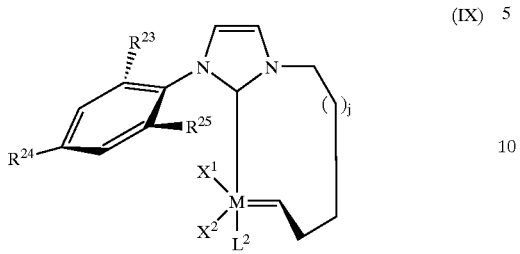

(IX)

in which j is an integer in the range of 1 to 6 inclusive, most preferably 3, and M, $L^2$, $X^1$, $X^2$, $R^{23}$, $R^{24}$, and $R^{25}$ are as defined above, and wherein, preferably, M is Ru, $L^2$ is a tri-substituted phosphine such as tricyclohexyl phosphine, $X^1$ and $X^2$ are halide, e.g., chloride, and $R^{23}$, $R^{24}$, and $R^{25}$ are lower alkyl, particularly methyl. These catalysts represent new chemical entities and are claimed as such herein.

The catalysts useful in conjunction with the present invention may be synthesized from the complex $(L^2)_2(X^1X^2)M=CHPh$, in which M, $L^2$, $X^1$, and $X^2$ are as defined above, and Ph is phenyl. The procedure used is a modification of that described by Fürstner et al. (2002) Chem.-Eur. J. 7:3236. In general terms, a cycloolefinic precursor substituted on an olefinic carbon atom with a leaving group (e.g., a bromine substituent) is contacted with the complex $(L^2)_2(X^1X^2)M=CHPh$ under condensation conditions, according to the following general scheme.

Scheme 1:

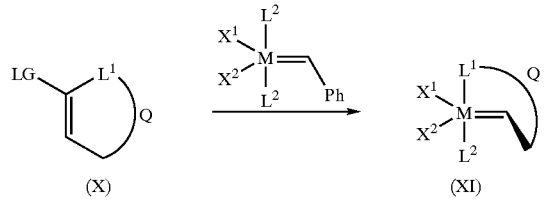

wherein LG represents the leaving group. In a more specific example, the starting material 1-mesityl-3-(7-octene)-imidazole bromide (1) is prepared by condensing mesityl imidazole with 8-bromooctene, and deprotonating the resulting salt. (1) is then brought into contact with the complex $(L^2)_2(X^1X^2)M=CHPh$ in a ligand displacement reaction, followed by dilution and heating to reflux to effect intramolecular cyclization to give the intermediate (XII). The reaction is illustrated in Scheme 2, and exemplified using phenylmethylene bis(tricyclohexylphosphine)-ruthenium dichloride ($X^1=X^2=Cl$; M=Ru; $L^2=PCy_3$) in Example 1.

Scheme 2:

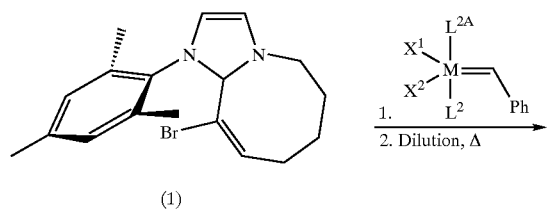

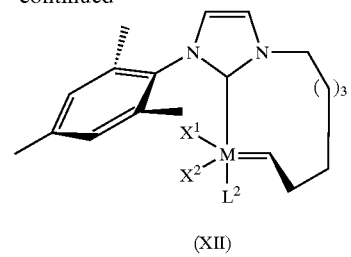

(XII)

These catalysts, when combined with a cyclic olefin under polymerization conditions, enable successive ring insertion metathesis polymerization in which the cyclic Group Q becomes increasingly larger and does not detach from the catalyst during the polymerization reaction.

In general, the cyclic olefin may be represented by the structure of formula (XV)

(XV)

wherein $R^6$ and J are as follows:

$R^6$ is selected from the group consisting of hydrogen, hydrocarbyl (e.g., $C_1$–$C_{20}$ alkyl, $C_5$–$C_{20}$ aryl, $C_5$–$C_{30}$ aralkyl, or $C_5$–$C_{30}$ alkaryl), substituted hydrocarbyl (e.g., substituted $C_1$–$C_{20}$ alkyl, $C_5$–$C_{20}$ aryl, $C_5$–$C_{30}$ aralkyl, or $C_5$–$C_{30}$ alkaryl), heteroatom-containing hydrocarbyl (e.g., $C_1$–$C_{20}$ heteroalkyl, $C_5$–$C_{20}$ heteroaryl, heteroatom-containing $C_5$–$C_{30}$ aralkyl, or heteroatom-containing $C_5$–$C_{30}$ alkaryl), and substituted heteroatom-containing hydrocarbyl (e.g., substituted $C_1$–$C_{20}$ heteroalkyl, $C_5$–$C_{20}$ heteroaryl, heteroatom-containing $C_5$–$C_{30}$ aralkyl, or heteroatom-containing $C_5$–$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphino, sulfonato, $C_1$–$C_{20}$ alkylsulfanyl, $C_5$–$C_{20}$ arylsulfanyl, $C_1$–$C_{20}$ alkylsulfonyl, $C_5$–$C_{20}$ arylsulfonyl, $C_1$–$C_{20}$ alkylsulfinyl, $C_5$–$C_{20}$ arylsulfinyl, sulfonamido, amino, amido, imino, nitro, nitroso, hydroxyl, $C_1$–$C_{20}$ alkoxy, $C_5$–$C_{20}$ aryloxy, $C_2$–$C_{20}$ alkoxycarbonyl, $C_5$–$C_{20}$ aryloxycarbonyl, carboxyl, carboxylato, mercapto, formyl, $C_1$–$C_{20}$ thioester, cyano, cyanato, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^6$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen or phosphorus atom, or through an electron-rich metal or metalloid such as Ge, Sn, As, Sb, Se, Te, etc. With such functional groups, there will normally be an intervening linkage Z, such that $R^6$ then has the structure $-(Z)_k$-Fn wherein k is 1, Fn is the functional group, and Z is a hydrocarbylene linking group such as an alkylene, substituted alkylene, heteroalkylene, substituted heteroalkene, arylene, substituted arylene, heteroarylene, or substituted heteroarylene linkage. In a preferred embodiment, $R^6$ is hydrogen, such that neither olefinic carbon atom is substituted.

J is a saturated or unsaturated hydrocarbylene, substituted hydrocarbylene, heteroatom-containing hydrocarbylene, or substituted heteroatom-containing hydrocarbylene linkage, and typically is a saturated unsubstituted hydrocarbylene linkage of 3 to 20 carbon atoms, preferably 3 to 10 carbon atoms. When J is substituted hydrocarbylene or substituted heteroatom-containing hydrocarbylene, the substituents may include one or more -(Z)$_k$-Fn groups, wherein k is zero or 1, and Fn and Z are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

Mono-unsaturated cyclic olefin reactants encompassed by structure (XV) may be represented by the structure (XVI)

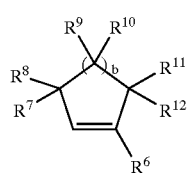

(XVI)

wherein b is an integer generally although not necessarily in the range of 1 to 10, typically 1 to 5, $R^6$ is as defined above, and $R^7$, $R^8$, $R^9$, $R^{10}$, $R^{11}$, and $R^{12}$ are independently selected from the group consisting of hydrogen, hydrocarbyl, substituted hydrocarbyl, heteroatom-containing hydrocarbyl, substituted heteroatom-containing hydrocarbyl and -(Z)$_k$-Fn where k, Z and Fn are as defined previously, and wherein if any of the $R^7$ through $R^{12}$ moieties is substituted hydrocarbyl or substituted heteroatom-containing hydrocarbyl, the substituents may include one or more -(Z)$_k$-Fn groups. Accordingly, $R^7$, $R^8$, $R^9$, $R^{10}$, $R^{11}$, and $R^{12}$ may be, for example, hydrogen, hydroxyl, $C_1$–$C_{20}$ alkyl, $C_5$–$C_{20}$ aryl, $C_1$–$C_{20}$ alkoxy, $C_5$–$C_{20}$ aryloxy, $C_2$–$C_{20}$ alkoxycarbonyl, $C_5$–$C_{20}$ aryloxycarbonyl, amino, amido, nitro, etc. Furthermore, any of the $R^7$ through $R^{12}$ moieties can be linked to any other of the $R^7$ through $R^{12}$ moieties to provide a bicyclic or polycyclic olefin, and the linkage may include heteroatoms or functional groups, e.g., the linkage may include an ether, ester, thioether, amino, alkylamino, imino, or anhydride moiety.

Examples of monounsaturated, monocyclic olefins encompassed by structure (XV) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 1-methylcyclopentene, 4-methoxycyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

Preferred cyclic olefin monomers useful in conjunction with the present methodology are unsubstituted monoolefins, particularly low-strain unsubstituted cis-monoolefins such as cis-cyclopentene, cis-cycloheptene, cis-cyclooctene, cis-cyclononene, cis-cyclodecene, cis-cycloundecene, and cis-cyclododecene, with cis-cyclooctene most preferred.

Monocyclic diene reactants encompassed by structure (XV) may be generally represented by the structure (XVII)

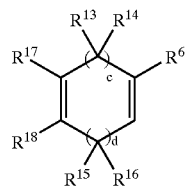

(XVII)

wherein c and d are independently integers in the range of 1 to about 8, typically 2 to 4, preferably 2 (such that the reactant is a cyclooctadiene), $R^6$ is as defined above, and $R^{13}$, $R^{14}$, $R^{15}$, $R^{16}$, $R^{17}$, and $R^{18}$ are defined as for $R^7$ through $R^{12}$. Examples of monocyclic diene reactants include, without limitation, 1,3-cyclopentadiene, 1,3-cyclohexadiene, 1,3-cyclohexadiene, 5-ethyl-1,3-cyclohexadiene, 1,3-cycloheptadiene, 1,5-cyclooctadiene, 1,3-cyclooctadiene, 1,5,9-trans-cis-trans-cyclododecatriene, and substituted analogs thereof. Preferred monocyclic dienes are 1,5-cyclooctadiene (COD) and 1,5,9-trans-cis-trans-cyclododecatriene (CDT). Triene reactants are analogous to the diene structure (XVII), and will generally contain at least one methylene linkage between any two olefinic segments.

With unsubstituted monocyclic olefins, a representative polymerization reaction may be illustrated schematically as follows:

Scheme 3:

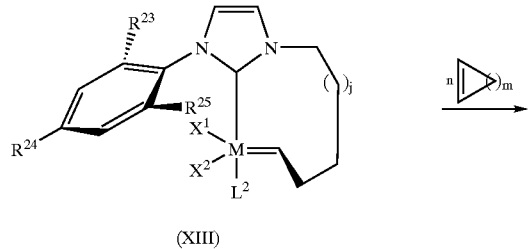

(XIII)

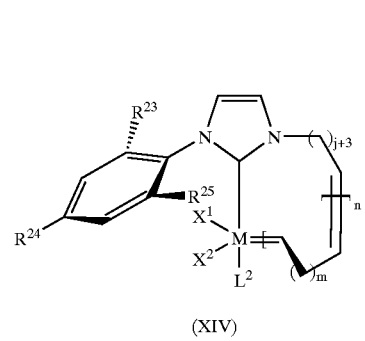

(XIV)

In the above molecular structures, j is as defined earlier, m is an integer in the range of 3 to about 20, preferably in the range of 6 to 10, and n is the number of cyclic olefin monomers incorporated during polymerization. Release of the macrocyclic polymer from the complex followed by hydrogenation gives cyclic polyethylene, as illustrated in Scheme 4:

Scheme 4:

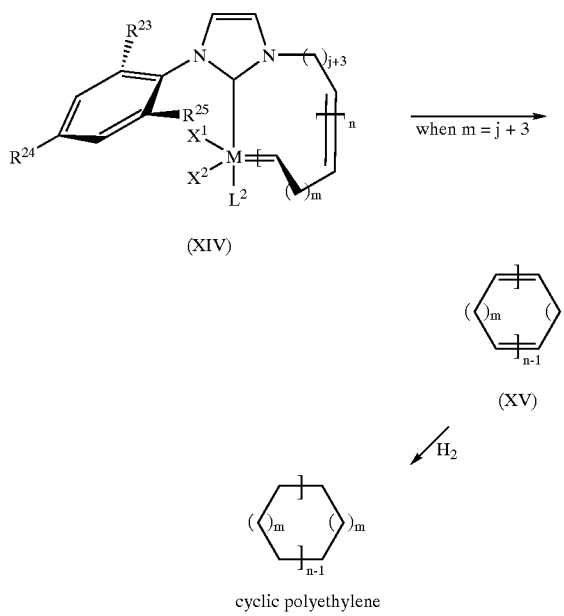

cyclic polyethylene

Polymerization is initiated by combining the catalyst with the cyclic olefin monomer in bulk or in solution, at a temperature in the range of about 30° C. to about 100° C. or greater, more preferably at a temperature in the range of about 35° C. to about 85° C., and most preferably at a temperature in the range of about 40° C. to about 60° C. Preferably, the reaction is agitated (e.g., stirred). The progress of the reaction can be monitored by standard techniques, e.g., nuclear magnetic resonance spectroscopy. Examples of solvents that may be used in the polymerization reaction include organic, protic, or aqueous solvents that are inert under the polymerization conditions, such as aromatic hydrocarbons, halogenated hydrocarbons, ethers, aliphatic hydrocarbons, alcohols, water, or mixtures thereof. Preferred solvents are halogenated hydrocarbon solvents, and the most preferred solvents are chlorinated solvents such as methylene chloride, chloroform, chlorobenzene, 1,2-dichloroethane, dichlorobenzene, and mixtures thereof. Polymerization is preferably carried out in a drybox under an inert atmosphere, and polymerization times will vary, depending on the particular monomer, catalyst, and desired molecular weight of the cyclic polymer product, but will generally involve on the order of 4 to 20 hours. In order to obtain a macrocyclic polymer substantially free of linear contaminants, i.e., containing less than 1 mol %, preferably less than 0.1 mol %, and most preferably less than 0.01 mol % linear contaminants, the cyclic olefin monomer should be free of any acyclic impurities.

A representative polymerization reaction of the invention, using cis-cyclooctene as the sole monomer, is illustrated in FIG. 1. As illustrated in FIG. 1, polymerization proceeds by successive addition/insertion of the monomer to the growing macrocycle on the catalytic complex, and the intermediate macrocyclic complex, shown as (3) in the figure) undergoes intramolecular chain transfer to yield the cyclic olefinic polymer (shown as the cyclic polyoctenamer in the figure). Advantageously, the reaction can be carried out as a "one-pot" polymerization, i.e., without need to isolate any linear (or other) intermediates. Depending on the desired molecular weight, polymerization may be terminated at any time by addition of a solvent effective to precipitate the polymer. With polyoctenamers, for example, which are prepared according to Scheme 3 when j is 3 and m is 6, addition of acetone or methanol will cause the polymer to precipitate and thus terminate the polymerization reaction.

The precipitated polymer may then be isolated by filtration or other conventional means. High molecular weight cyclic polymers can be prepared, having number average molecular weights $M_n$ of at least 150 kD, preferably at least 500 kD. The present process has in fact enabled preparation of polyoctenamers and cyclic polyethylene having molecular weights in excess of 1000 kD, and even 1200 kD, particularly when the initial monomer concentration is sufficiently high, e.g., for cyclooctene, at least 0.25 M in toluene. Polymers can also be obtained with polydispersity indices (PDIs) of 2.3 or less, generally in the range of about 1.5 to 2.0. It should also be noted that over 80% of the catalyst can be recovered from the polymerization by column chromatography or other means.

Polymerization may, if desired, be carried out on a solid support, using solid phase synthesis techniques. Typical substrates are those conventionally used in solid phase chemistry and which allow for chemical synthesis thereon. The only limitation upon the materials useful for constructing substrates is that they must be compatible with the polymerization reaction conditions to which they are exposed. Suitable substrates useful in practicing the methods of the invention include, but are not limited to, organic and inorganic polymers (e.g., polyethylene, polypropylene, polystyrene, polytetrafluoroethylene), metal oxides (e.g., silica, alumina), mixed metal oxides, metal halides (e.g., magnesium chloride), minerals, quartz, zeolites, and the like. Other substrate materials will be apparent to those of skill in the art.

Following polymer synthesis and recovery, the olefinic polymer provided may be hydrogenated using conventional means, e.g., via standard $H_2$/Pd/C procedures or via tosylhydrazine decomposition (see Hahn (1992) *J. Polym. Sci. Polym. Chem.* 30:397). Generally, either procedure will result in hydrogenation of more than 99% of the olefinic functionalities in the polymer backbone, as may be determined by $^1$H and $^{13}$C NMR spectroscopy.

It should also be noted that macrocyclic copolymers can be prepared using two or more different cyclic olefin monomers in the polymerization reaction.

It is to be understood that while the invention has been described in conjunction with the preferred specific embodiments thereof, that the description above as well as the examples that follow are intended to illustrate and not limit the scope of the invention. Other aspects, advantages and modifications within the scope of the invention will be apparent to those skilled in the art to which the invention pertains.

All patents, patent applications, journal articles and other reference cited herein are incorporated by reference in their entireties.

EXPERIMENTAL:

In the following examples, efforts have been made to ensure accuracy with respect to numbers used (e.g., amounts, temperature, etc.) but some experimental error and deviation should be accounted for. Unless indicated otherwise, temperature is in degrees C. and pressure is at or near atmospheric.

All chemical reagents were obtained from Aldrich and purified prior to use following the guidelines of Perrin and Armarego, *Purification of laboratory Chemicals,* Fourth Edition (Oxford, Butterworth-Heinemann, 1996). Organic solutions were concentrated under reduced pressure on a Büchi rotary evaporator. Methylene chloride was distilled from calcium hydride prior to use.

$^1$H and $^{13}$C NMR spectra were recorded on Varian Mercury 300 spectrometers (300 MHz and 75 MHz, respectively) as noted, and are internally referenced to residual protio solvent signals. Data for $^1$H NMR are reported as follows: chemical shift (δ ppm), multiplicity (s=singlet, d=doublet, t=triplet, q=quartet, m=multiplet, br=broad), coupling constant (Hz), integration and assignment. Data for $^{13}$C NMR are reported in terms of chemical shift (δ ppm). All NMR spectra were recorded in CDCl$_3$ or DMSO-d$_6$. IR spectra were recorded on a Perkin Elmer spectrometer and are reported in terms of frequency of absorption (cm$^{-1}$). Mass spectra were obtained from the UC Irvine Mass Spectral facility. High performance liquid chromatography (HPLC) was performed on Hewlett-Packard 1100 Series chromatographs using Chiralpak AD column (0.46×25 cm) and AD guard (0.46×5 cm). Optical rotations were taken using a Jasco P-1010 polarimeter (WI lamp, 589 nm, 25° C.).

General Procedure A: Polymerization reactions were conducted at 45° C. in CH$_2$Cl$_2$ in a nitrogen-filled drybox. A round bottom flask was charged with monomer and solvent, if any. The ruthenium alkylidene catalyst was then added. The flask was sealed and heated to 45° C. for 12 hours, at which time excess cold acetone or methanol was added to cause precipitation of the polymer. The polymer was then collected by filtration, dried under dynamic vacuum, and weighed. Polymer characterization was carried out by gel permeation chromatography, light scattering, intrinsic viscosity measurements, $^1$H and $^{13}$C NMR spectroscopy, and thermal gravimetric analyses.

EXAMPLE 1

REPRESENTATIVE CATALYST SYNTHESIS

A cyclic ruthenium alkylidene complex was prepared using a "one-pot" modification of a previously reported procedure (Fürstner et al. (2002), supra). The synthesis is illustrated in Scheme 5:

Scheme 5:

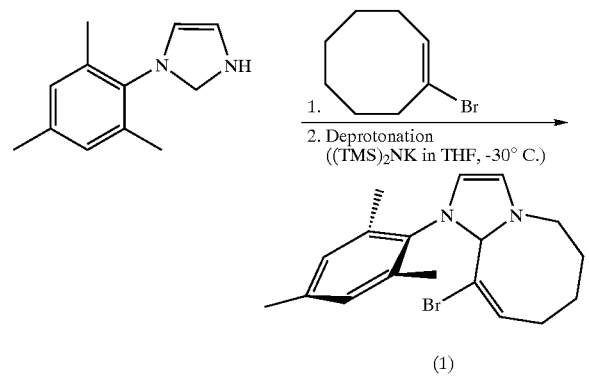

1-Mesityl-3-(7-octene)-imidazole bromide was first prepared by condensing mesityl imidazole with 8-bromooctene in nearly quantitative yield. The resulting salt was deprotonated with (TMS)$_2$NK (TMS=tetramethylsilyl)(1.2 eq) in tetrohydrofuran (THF) at −30° C. for 30 minutes to give (1), followed by in-line cannula transfer to a 0.02 M (toluene) solution of the Ru complex (PCy$_3$)$_2$Cl$_2$Ru=CHPh (Cy= cyclohexyl) at 0° C. This solution was slowly brought to room temperature, and after 1 hour, ligand displacement was determined to be complete by $^1$H and $^{31}$P NMR spectroscopies. The reaction mixture was then diluted with n-pentane to 1 μM and heated to reflux for 2 hours to induce intramolecular cyclization. Purification by column chromatography (hexanes/diethyl ether 3:1 as eluant) afforded cyclic complex (2) in 77% isolated yield. Spectroscopic data for the cyclic complex is in accord with the previously reported synthesis (Fürstner et al.; see above).

EXAMPLE 2

SYNTHESIS OF CYCLIC POLYOCTENAMERS

Figure 1B:
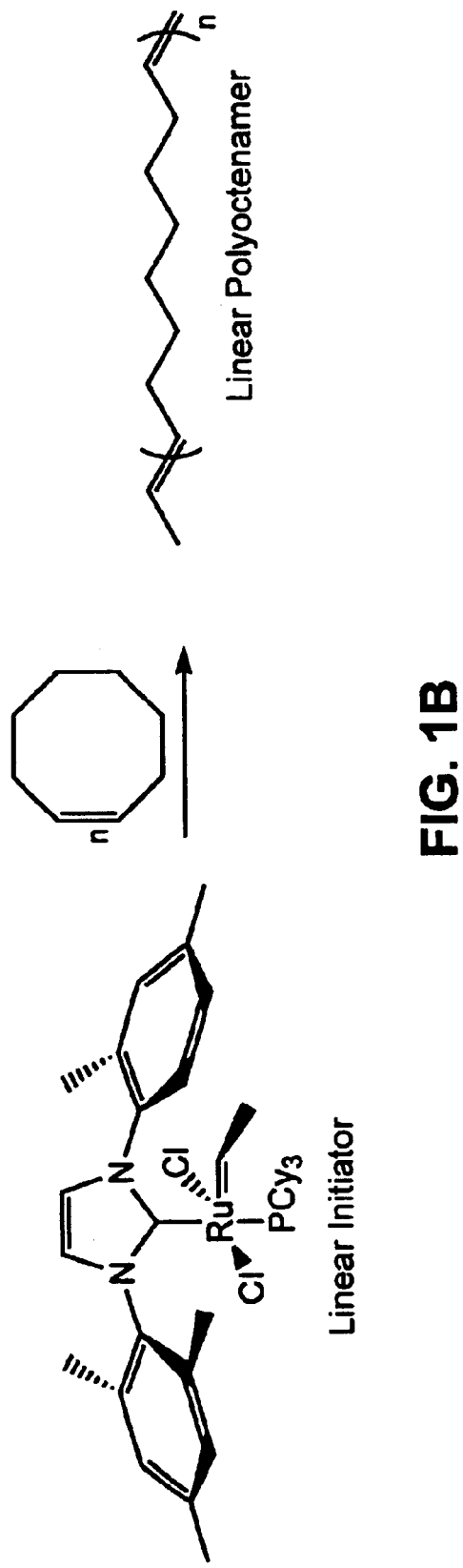

Ruthenium alkylidene complex (2), prepared in Example 1, was used to catalyze the synthesis of a cyclic polyoctenamer according to General Procedure A. Addition of (2) to cis-cyclooctene monomer in CH$_2$Cl$_2$ solution at 45° C. initiated polymerization, as schematically illustrated in FIG. 1A. The resulting macrocyclic complex, intermediate (3), underwent intramolecular chain transfer to yield the cyclic polymer and regenerate catalyst (2) in its original form. No additional purification steps were necessary. A variety of polymers with number average molecular weights ($M_n$) up to 1200 kD were prepared by varying the initial monomer/catalyst ratio and/or the initial monomer concentration. When initial monomer concentrations of less than 0.2 M were used, only low molecular weight cyclic oligomers (MW<2 kD) were obtained. In all cases, the polydispersity indices (PDIs) of the resulting polymers were approximately 2.0.

EXAMPLE 3

COMPARISON OF THE CYCLIC POLYOCTENAMERS WITH CORRESPONDING LINEAR POLYMERS

Figure 2:
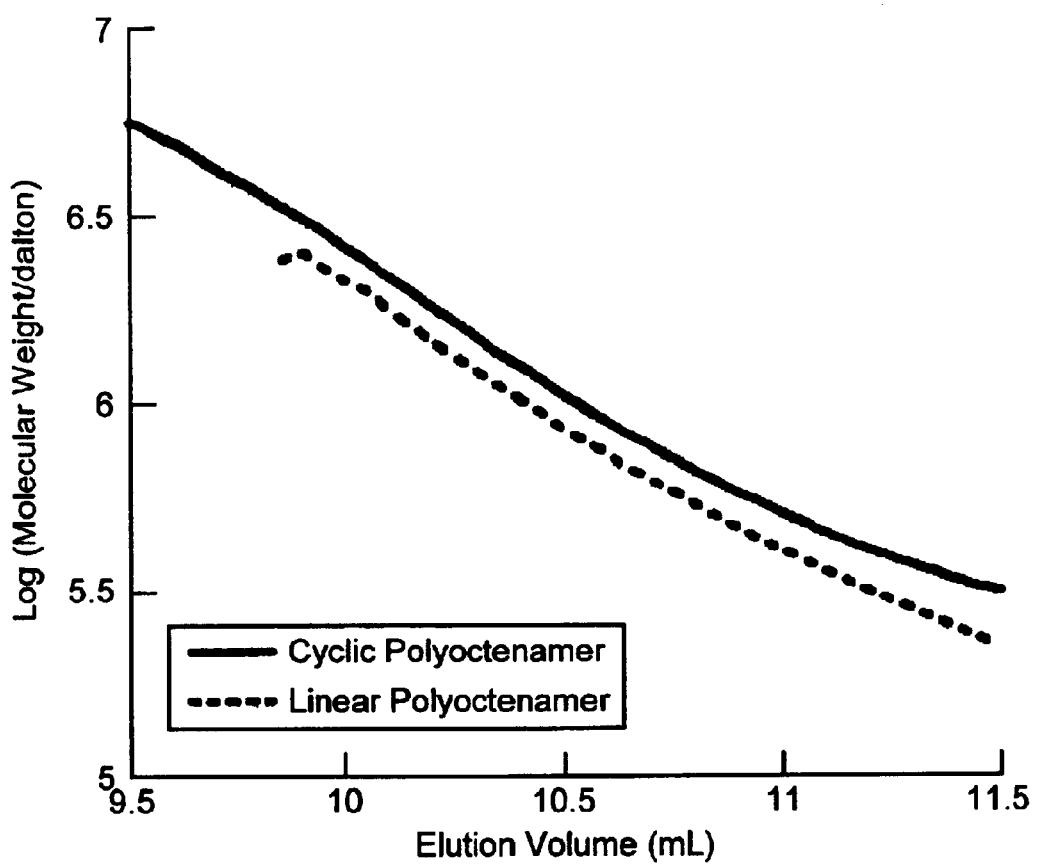
FIGS. 2 and 3 are size-exclusion chromatograms of cyclic and linear analog polymers, as discussed in Examples 2 and 3.
Figure 3:
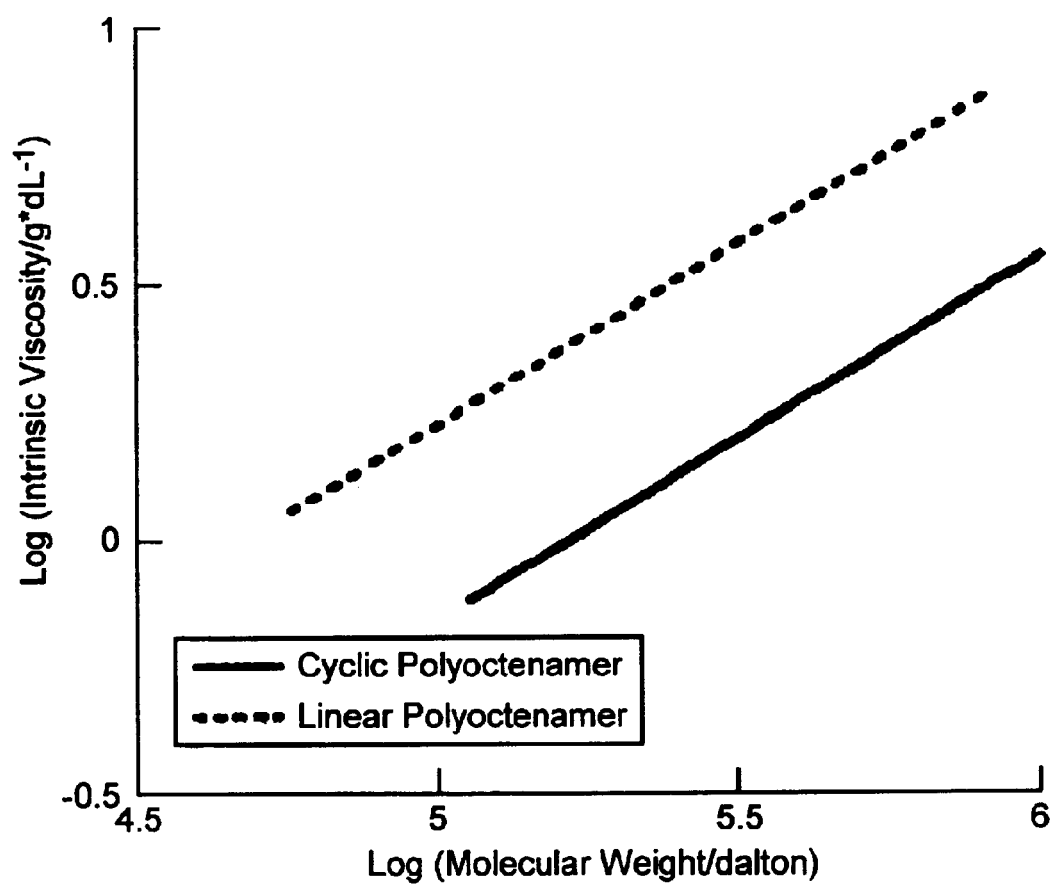

The circular structure of the prepared polyoctenamers was confirmed using a variety of characterization techniques. For comparison, a series of linear polyoctenamers with similar molecular weights and PDIs were synthesized using previously reported procedures, schematically illustrated in FIG. 1B). Size-exclusion chromatography (SEC) (FIGS. 2 and 3) indicated that the physically more compact cyclic polymers possessed smaller hydrodynamic volumes (i.e., they eluted later) and had lower intrinsic viscosities than their linear analogs ($[\eta]_{cyclic}/[\eta]_{linear}$=0.4). Viscosity measurements were performed in THF at 30° C. using an SEC-viscometer apparatus. The observed ratio of 0.4 is in accord with theory for cyclic and linear polymers in good solvents (W. Burchard, in Cyclic Polymers (Elsevier Applied Science, London, 1986), pp. 43–84). Furthermore, Mark-Houwink plots (log η versus log $M_w$) (FIG. 3) ruled out the possibility that these effects were related to conformational differences, as both polymers appeared to behave as random coils in solution (the Mark-Houwink parameter was 0.7 in both cases). The root mean square (RMS) radius ($<R_g^2>^{0.5}$) of the cyclic and linear polymers was measured using SEC coupled to a multiangle light-scattering detector. The corresponding ratio $<R_g^2>_{cyclic}/<R_g^2>_{linear}$ was found to be approximately 0.5 over a wide range of molecular weights (FIG. 2C), as predicted by theory (see Zimm et al. (1949) J. Chem. Phys. 17:1301). End groups were not observable in the nuclear magnetic resonance (NMR) spectra in any of the isolated cyclic polymers. The geometry of the olefins in polymer backbone was determined to be predominantly trans (~66%). Signals in the mass spectrum, obtained using a matrix-assisted laser desorption ionization-time of flight (MALDI-TOF) mass spectrometer, were multiples of 110.2 ($C_8H_{12}$) with a remainder equal only to the matrix ion.

Figure 4A:
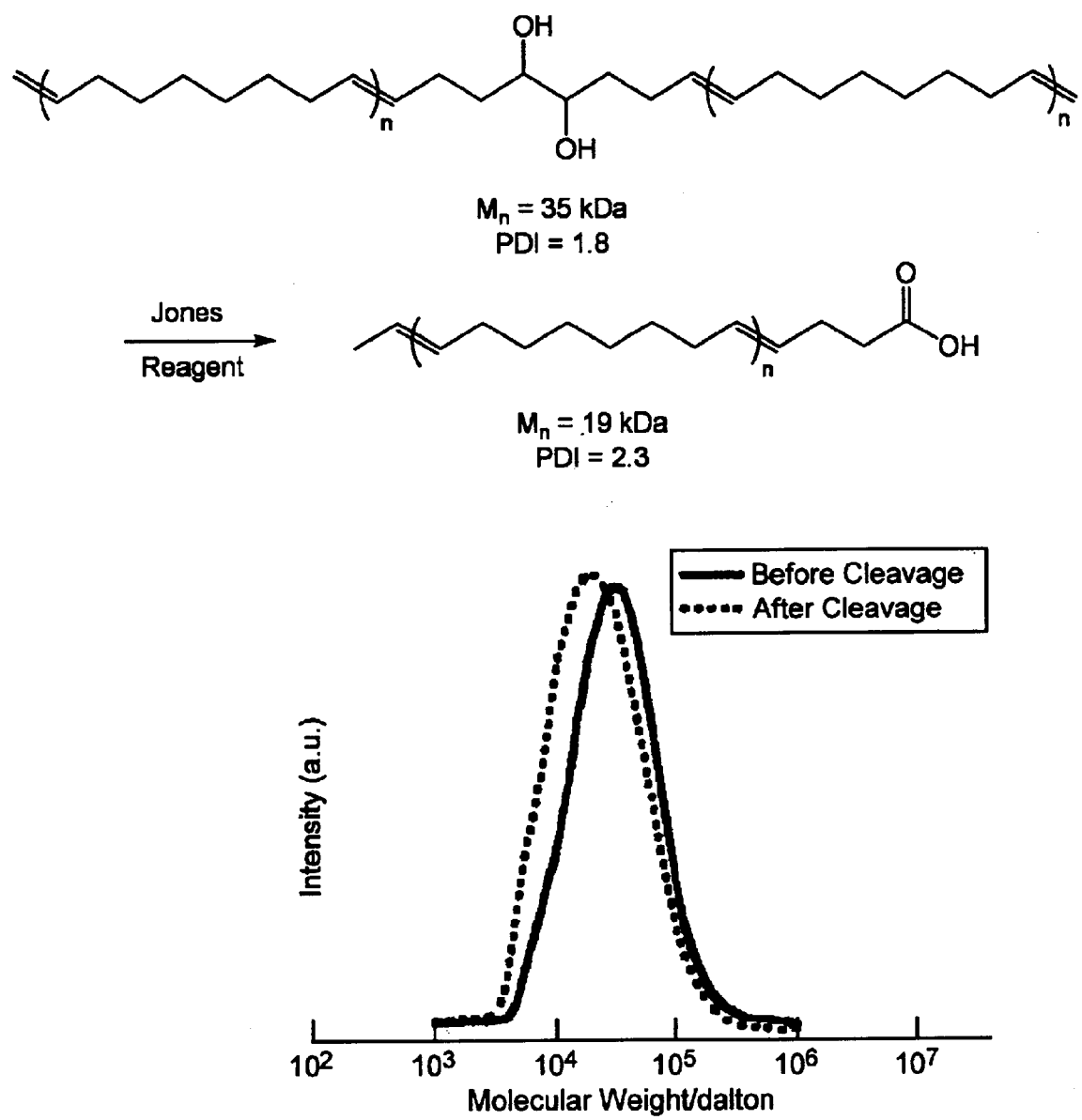
FIGS. 4A and 4B depict the molecular weight characteristics of cyclic polyoctenamer cleaved to form linear polymer and the molecular weight characteristics of linear polyoctenamers, respectively.
Figure 4B:
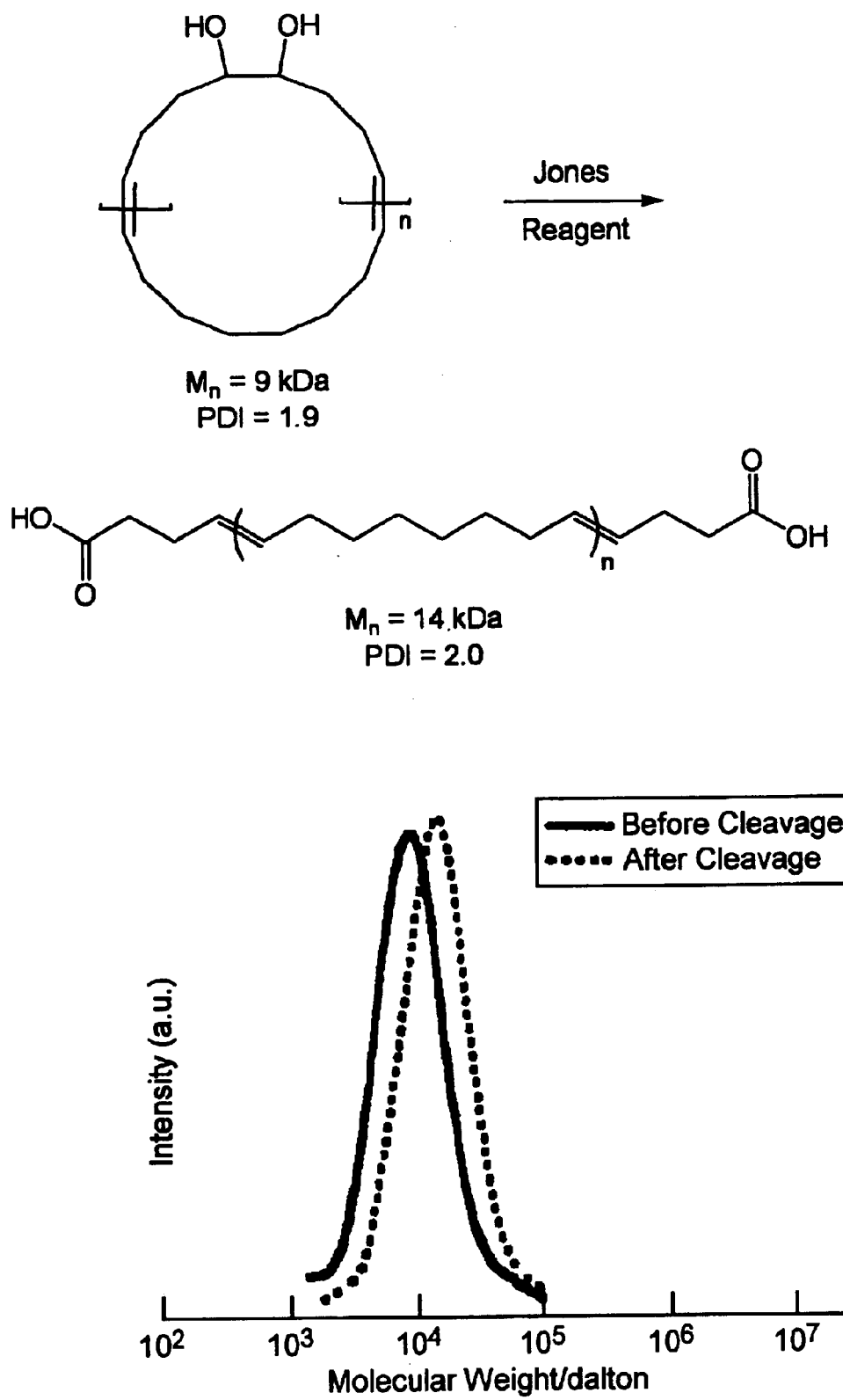

Although these characterization techniques provided strong physical evidence for circularity of the polymers synthesized, additional proof was obtained from chemical methods as well. Substrates containing 1,2-diols are known to undergo carbon-carbon bond cleavage to produce the corresponding bis-carboxylic acid species upon addition of excess Jones's Reagent ($CrO_3/H_2SO_4$, see K. B. Wiberg, *Oxidation in Organic Chemistry* Academic Press, New York, 1965). Linear (MW=35 kD; PDI=1.8) and cyclic (MW=9 kD; PDI=1.9) polyoctenamers containing on average only one 1,2-diol group per polymer chain were obtained by adding a small amount of 1,2-diol-5-cyclooctene during the ROMP of cis-cyclooctene ([1,2-diol-5-cyclooctene]$_0$/[cis-cyclooctene]$_0$=25; [total monomer]$_0$= 0.5 M in $CH_2Cl_2$). After the cyclic and linear polyoctenamers were independently reacted with Jones's Reagent, the resultant polymers were precipitated from excess acetone and collected. Cleaving the 1,2-diol-containing cyclic polyoctenamer afforded a polymer with a similar polydispersity but a larger apparent molecular weight (14 kD versus 9 kD) (FIGS. 4A and 4B). The increased molecular weight was expected since linear polymers have larger hydrodynamic volumes than their cyclic analogs. In contrast, the polymer obtained by cleaving the linear polyoctenamer showed not only an apparent molecular weight that was nearly cut in half (MW=19 kD; PDI=2.3) but one that was more polydisperse as well. By assuming a continuous and random distribution of cleavable groups into infinitely long chains, the PDI was calculated to increase by a factor of 4/3 after cleavage.

EXAMPLE 4

HYDROGENATION OF CYCLIC POLYOCTENAMERS AND CHARACTERIZATION OF CYCLIC POLYETHYLENES

Figure 5:
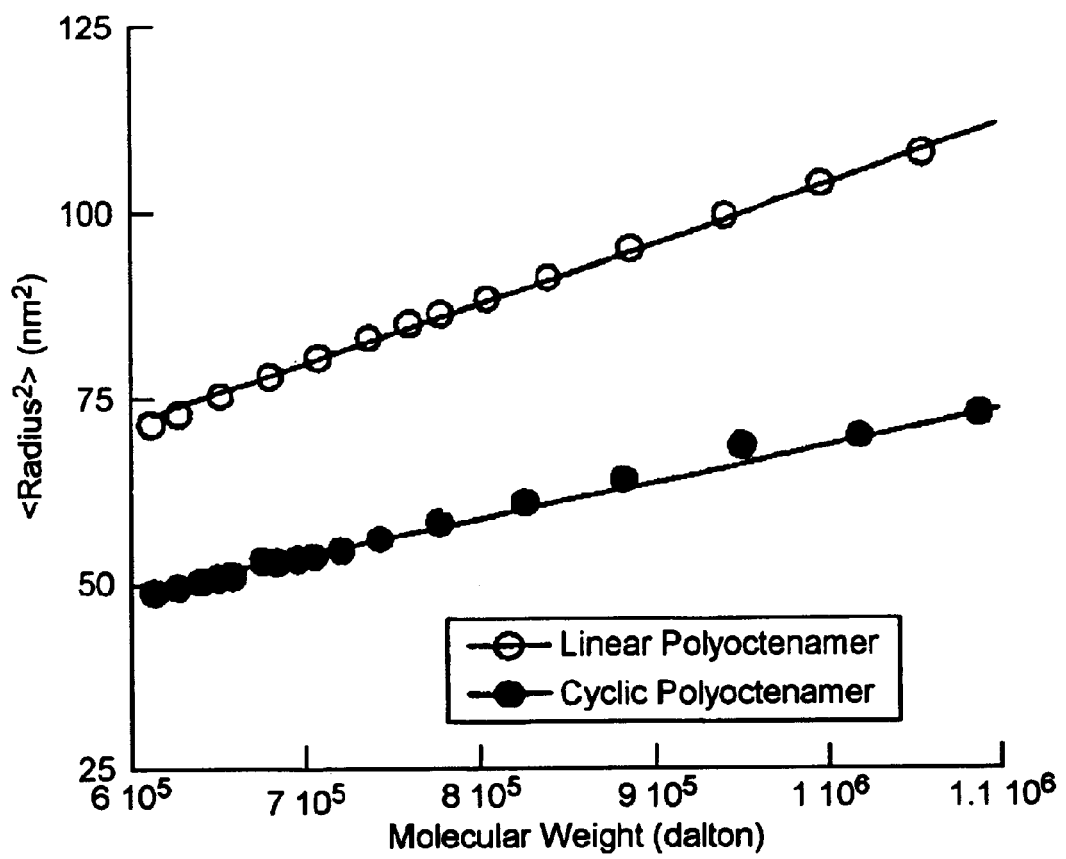
FIG. 5 shows a plot of the mean square radius ($<R_g^2>$) versus molecular weight for linear and cyclic polyoctenamers, as discussed in Example 4.
Figure 6:
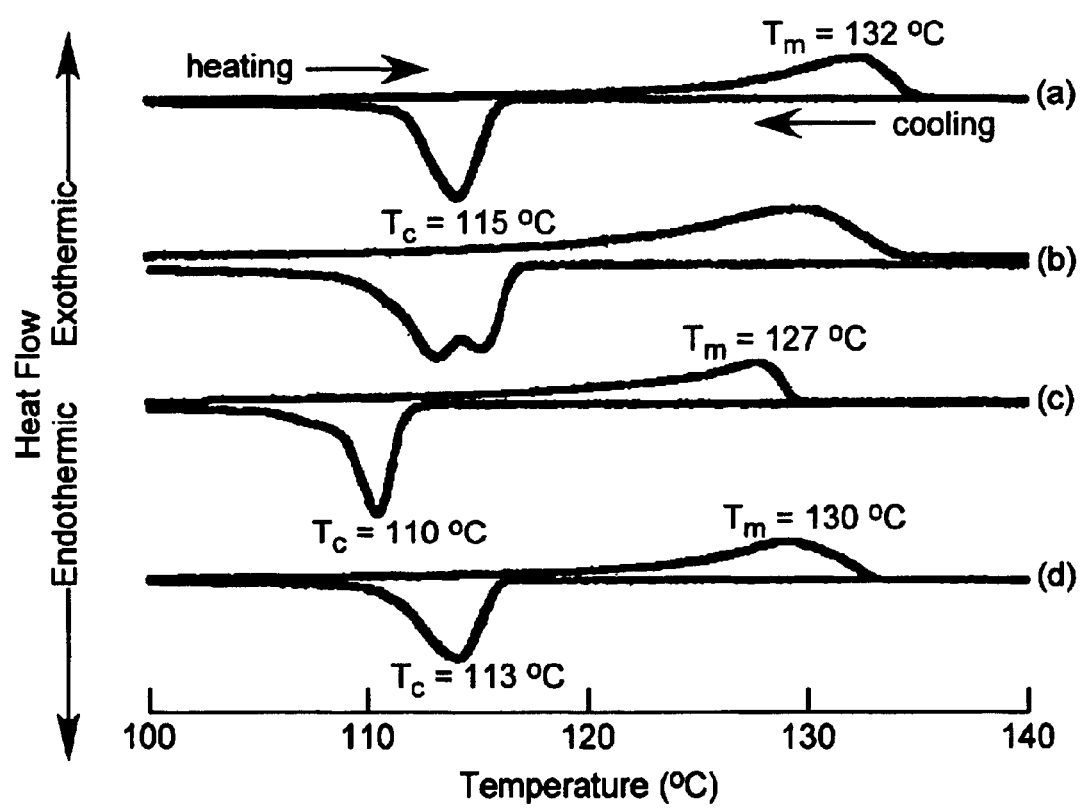
FIG. 6 shows differential scanning calorimetry thermograms, performed at heating and cooling rates of 10° C./min under nitrogen atmosphere, for (a) cyclic polyethylene, M$_n$≈200 kD; (b) and equal mixture of cyclic and linear polyethylene after they were melted (200° C.), cooled to 25° C., and then annealed for 36 hours; (c) an equal mixture of cyclic and linear polyethylene, previously dissolved in xylenes, after solvent was removed; (d) linear polyethylene, M$_n$≈200 kD.

The cyclic polyoctenamers prepared in Example 2 were hydrogenated using either standard $H_2$/Pd/C procedures or tosylhydrazine decomposition (Hahn (1992) *Polym. Sci. Polym. Chem.* 30:397). Either procedure resulted in hydrogenation of more than 99% of the olefins in the polyoctenamer's backbone, as determined by $^1H$ and $^{13}C$ NMR spectroscopy. FIG. 5 shows a plot of the mean square radius ($<R_g^2>$) versus molecular weight of the polymer. Differential scanning calorimetry (DSC) was used to compare the thermal properties of high molecular weight (MW≈200 kD) cyclic polyethylene with a linear analog of similar molecular weight (FIG. 6). The cyclic polymer had a slightly higher melting point ($T_m$=132° C.) and crystallization point ($T_c$= 115° C.) when compared with its linear analog ($T_m$=130° C.; $T_c$=113° C.). When equal amounts of linear and cyclic polyethylenes were mixed and melted together at 200° C.) and then slowly cooled (1° C./min to 25° C.) and annealed (150° C., 36 hours), their characteristic $T_m$ and $T_c$ points were again observed upon subsequent thermal cycling. However, when equal amounts of the two samples were dissolved in hot xylenes followed by rapid solvent evaporation, depressed melting and crystallization points ($T_m$=127° C.; $T_c$=1 10° C.) were observed. Presumably, the low mobility of the high molecular weight chains caused by polymer entanglement and/or threading prevented phase separation even under prolonged annealing. These results suggest that the cyclic and linear polyethylenes are not phase compatible, and effectively behave as contaminants with respect to each other. For comparison, phase separation is known to occur in mixtures of linear and highly branched (>8 branches/100 backbone carbons) polyethylene; see Wignall et al. (2000)., *Macromolecules* 33:551 and references therein.

EXAMPLE 5

SURFACE TOPOLOGY ANALYSIS/PREPARATION OF FILMS

Thin films of low molecular weight cyclic and linear polyethylenes (MW approximately 10 kD) were cast from xylenes, and their interfacial contact angle with water was measured following literature methods (see Kwok et al. (1999) *Adv. Colloid Interface Sci.* 81:167). The film composed of the cyclic polymer showed a larger contact angle (θ=105±2°) than its linear analog (θ=96±2°), which indicated that the interface with water was smaller on the cyclic polymer's surface. Migration of the linear polymer's end groups to the surface would be expected to form a different interfacial topology than the cyclic polymer and thus may lead to contact angle hysteresis. No differences in θ were observed between high molecular weight (~200 kD) cyclic and linear polyoctenamers, suggesting that surface topology is affected by the presence or absence of end groups.

EXAMPLE 6

SYNTHESIS OF CYCLIC POLYBUTADIENE FROM COD AND PRODUCT CHARACTERIZATION

The ROMP of COD was initiated by adding the catalyst (2) to a $CH_2Cl_2$ solution of the monomer at 45° C. After 12 h, the polymer was isolated by precipitation from cold acetone or methanol followed by filtration. Polymers with a range of molecular weights were prepared by varying the initial monomer/catalyst (2) ratio or the initial monomer concentration (see Table 1). In all cases, the polydispersity indices (PDIs) of the polymeric products were found to be near 2.0. Extensive chain transfer in olefin metathesis polymerizations approximates a step-growth polymerization where PDIs of 2.0 are expected at high conversion (see Ivin, K. J.; Mol, J. C. *Olefin Metatheses and Metathesis Polymerization;* Academic Press: London, 1997). Polymerizations under dilute conditions (<0.1 M) resulted in the formation of only low-MW oligomers. (The critical monomer concentration of COD has previously been determined to be ~0.25 M at 25° C., see Suter et al. (1988) *Makromol. Chem.* 189:1603 and Höcker et al. (1980) *J. Mol. Catal.* 8:191.

TABLE 1

Synthesis of Polybutadienes Using 1,5-Cyclooctadiene as Monomer

| [M/I]$_0$ | [Monomer]$_0$ (M) | % Yield | Mn (×10$^3$ Da) | PDI |
|---|---|---|---|---|
| 25 | 1.0 | 84 | 2.3 | 1.59 |
| 50 | 1.0 | 86 | 5.0 | 1.7 |
| 100 | 1.0 | 88 | 8.5 | 1.7 |
| 1150 | 1.0 | 87 | 86 | 1.9 |
| 100 | 0.5 | 83 | 2.2 | 1.7 |
| 100 | 0.1 | 0 | — | — |
| 100 | 4.0 | 90 | 26 | 1.9 |
| 100 | 8.1 | 95 | 145 | 1.8 |

The circular nature of the polymers was examined using a variety of techniques and compared with linear analogues of similar MW. Linear polybutadienes were prepared by using linear catalyst (IMes)(PCy$_3$)Cl$_2$Ru=CHPh (4) and the ROMP techniques described in Bielawski et al. (2000)

*Angew. Chem., Int. Ed.* 39:2903 and Frenzel et al. (2000) *J. Organomet. Chem.* 606:8. As expected, end-groups were not observable by $^1$H- or $^{13}$C NMR spectroscopy on low-MW (~2.3 kDa) samples prepared using complex (y). The microstructure of the polybutadienes prepared using either COD or CDT as the monomer contained only the 1,4-regioisomer with a predominantly trans (65%) olefin geometry, as determined by $^1$H and $^{13}$C NMR spectroscopies. Representative spectroscopic data for cyclic polybutadiene: $^1$H NMR (300 MHz, CDCl$_3$): ‰ 5.42 (CH, trans), 5.38 (CH, cis), 2.07 (CH$_2$, cis), 2.04 (CH$_2$, trans); $^{13}$C NMR (75 MHz, CDCl3): ‰ 130.0, 129.9, 129.5, 129.3, 32.8, 32.8, 32.7, 27.5. Mass peaks in the MALDI-MS spectrum were separated by 54.1 Da (C$_4$H$_6$) with a remainder equal to the matrix ion. The intrinsic viscosities ([η]) of the cyclic and linear polymers were measured over a range of MWs using a size-exclusion chromatograph coupled to a differential viscometer. In the low-MW regime, the cyclic polymers were less viscous than their linear analogues, as expected (Burchard, W. in *Cyclic Polymers*; Semlyen, J. A., Ed.; Elsevier Applied Science: London, 1986; pp 43–84). However, as the MW increased, the viscosities of the two polymers approached and eventually converged with each other. This suggested that the cyclic polymer was contaminated with its linear analogue.

Previously reported syntheses of cyclic polybutadienes involve the living anionic polymerization of 1,3-butadiene followed by a subsequent intramolecular cyclization reaction (see Roovers et al. (1988) *J. Polym. Sci., Part B: Polym. Phys.* 26:1251 and Roovers (1989) *Rubber Chem. Technol.* 62:33). The inherent sensitivity associated with such anionic polymerizations leads to samples contaminated with linear polymer. Furthermore, since polybutadiene's microstructure (1,2- vs 1,4-regioisomers) remains highly dependent on reaction conditions (e.g., solvent, temperature, additives, etc.), its control remains challenging. In contrast, the present invention approach overcomes these obstacles since it is unnecessary to rigorously exclude of air, moisture, or highly purified solvents. Elaborate purification techniques are also unnecessary.

EXAMPLE 7

SYNTHESIS OF CYCLIC POLYBUTADIENE FROM CDT AND PRODUCT CHARACTERIZATION 1,5,9-trans-cis-trans-cyclododecatriene (CDT) was also used as monomer to prepare cyclic polybutadiene since it is commercially available, free of 4VC, and also provides 1,4-polybutadiene via ROMP. (COD and CDT are industrially synthesized through a Ni-catalyzed oligomerization of 1,3-butadiene. The formation of 4VC is an unavoidable side reaction. For further details, see: Gerhartz, W. *Ullmann's Encyclopedia of Industrial Chemistry*; VCH: Weinheim, Federal Republic of Germany, 1985. For an example of polymerizing-CDT using ROMP, see Thom-Csanyi et al. (1995) *Macromol. Chem. Phys.* 196:1043). Polymerization was conducted according to General Procedure A. When CDT was used as the monomer (polymerization conditions: [CDT/(2)]$_0$=500, [CDT]$_0$=2.0 M in CH$_2$Cl$_2$, 45° C., 12 h) the [η] of the cyclic polymer was lower than its linear analogue over the entire range of molecular weights measured. Furthermore, the cyclic polymers were found to elute later than their linear analogues in the size-exclusion chromatogram which provided additional evidence that the polymer formed was cyclic.

As with the ROMP of COD described in Example 6, the molecular weight of the polybutadienes prepared from CDT could be tuned by varying the initial monomer/catalyst ratio or the initial monomer concentration (see Table 2). To help gain a mechanistic insight into the polymerization process, the dynamics of the ROMP of CDT were monitored using a combination of gas chromatography, size exclusion chromatography, and $^1$H NMR spectroscopy. Monomer consumption was extremely fast ($\tau_{1/2} \approx 10$ min) with a concomitant rapid growth in polymer molecular weight. However, depolymerization was evident as the average MW subsequently decreased slowly over time and finally plateaued after about 12 h. In addition, the average olefin geometry in the polymer backbone slowly increased over time to represent about 65% of the trans isomer. Furthermore, the PDIs of the resultant polymers were near 2.0 which are typical of equilibrium-controlled polymerizations.

TABLE 2

Synthesis of Polybutadienes Using
1,5,9-trans-cis-trans-Cyclododecatriene as Monomer

| [M/I]$_0$ | [Monomer]$_0$ (M) | % Yield | Mn (×10$^4$ Da) | PDI |
|---|---|---|---|---|
| 1000 | 2.5 | 85 | 12 | 1.9 |
| 2500 | 2.5 | 80 | 32 | 1.8 |
| 6000 | 5.0 | 90 | 88 | 1.7 |
| 2500 | 1.0 | 0 | — | — |

We claim:

1. A method for synthesizing a cyclic polymer via a ring insertion polymerization reaction, comprising combining, to provide a reaction mixture, a cyclic olefin monomer with a catalytically effective amount of a transition metal alkylidene complex containing a cyclic group of known size, whereby: the cyclic olefin monomer successively inserts into the cyclic group to increase the size thereof in a stepwise manner without detachment of any linear species from the complex; and following completion of polymerization on the transition metal alkylidene complex, the cyclic polymer is released from the complex by an intramolecular chain transfer reaction.

2. The method of claim 1, wherein the reaction is carried out in the liquid phase.

3. The method of claim 2, wherein a solvent is added to the reaction mixture.

4. The method of claim 2, wherein the cyclic olefin monomer serves as a solvent and no additional solvent is added to the reaction mixture.

5. The method of claim 2, further including precipitating the cyclic polymer by addition of a precipitating solvent to the reaction mixture.

6. The method of claim 5, further including isolating the precipitated polymer by filtration.

7. The method of claim 1, wherein the transition metal alkylidene complex has the structure of formula (I)

(I)

wherein:

M is a Group 8 transition metal;

L$^1$ and L$^2$ are neutral electron donor ligands;

X$^1$ and X$^2$ are anionic ligands, and may be taken together to form a single bidentate ligand; and Q is a linkage selected from optionally substituted and/or heteroatom-containing C$_1$–C$_{20}$ alkylene, C$_2$–C$_{20}$ alkenylene, C$_2$–C$_{20}$ alkynylene, C$_5$–C$_{24}$ arylene, C$_6$–C$_{24}$ alkarylene, and C$_6$–C$_{24}$ aralkylene linkages, wherein L$^1$ and L$^2$ can be taken together with each other or with X$^1$ or X$^2$ to form a cyclic group, and further wherein any one of X$^1$, X$^2$, L$^1$ and L$^2$, R$^1$, and R$^2$ can be attached to a solid support.

8. The method of claim 7, wherein M is Ru or Os.

9. The method of claim 8, wherein M is Ru.

10. The method of claim 9, wherein:

$L^1$ is a carbene ligand;

$L^2$ is selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether; and $X^1$ and $X^2$ are independently selected from hydrogen, halide, $C_1$–$C_{20}$ alkyl, $C_5$–$C_{20}$ aryl, $C_1$–$C_{20}$ alkoxy, $C_5$–$C_{20}$ aryloxy, $C_2$–$C_{20}$ alkoxycarbonyl, $C_6$–$C_{20}$ aryloxycarbonyl, $C_2$–$C_{20}$ acyl, $C_2$–$C_{20}$ acyloxy, $C_1$–$C_{20}$ alkylsulfonato, $C_5$–$C_{20}$ arylsulfonato, $C_1$–$C_{20}$ alkylsulfanyl, $C_5$–$C_{20}$ arylsulfanyl, $C_1$–$C_{20}$ alkylsulfinyl, or $C_5$–$C_{20}$ arylsulfinyl, any of which, with the exception of hydrogen and halide, are optionally further substituted with one or more groups selected from halide, $C_1$–$C_6$ alkyl, $C_1$–$C_6$ alkoxy, and phenyl; and Q is $C_2$–$C_{18}$ alkylene or $C_2$–$C_{18}$ alkenylene.

11. The method of claim 10, wherein:

$L^1$ is an N-heterocyclic carbene ligand;

$L^2$ is a phosphine ligand of the formula $PR^1R^2R^3$, where $R^1$, $R^2$, and $R^3$ are each independently aryl or $C_1$–$C_{10}$ alkyl;

$X^1$ and $X^2$ are independently selected from halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate; and Q is $C_2$–$C_{12}$ alkylene or $C_2$–$C_{13}$ alkenylene.

12. The method of claim 11, wherein the transition metal alkylidene complex has the structure of formula (IX)

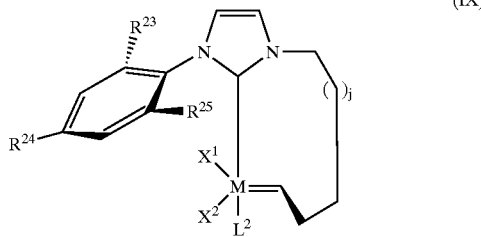

(IX)

in which j is an integer in the range of 1 to 6 inclusive, $X^1$ and $X^2$ are halide, and $R^{23}$, $R^{24}$, and $R^{25}$ are lower alkyl.

13. The method of claim 12, wherein j is 3, $X^1$ and $X^2$ are chloride, and $R^{23}$, $R^{24}$, and $R^{25}$ are methyl.

14. A transition metal alkylidene complex having the structure of formula (IX)

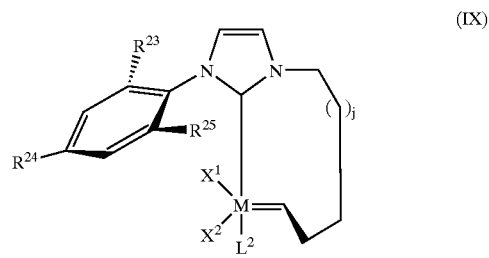

(IX)

wherein:

j is an integer in the range of 1 to 6 inclusive;

M is a Group 8 transition metal;

$L^2$ is a neutral electron donor ligand, and $X^1$ and $X^2$ are anionic ligands, wherein any two of $L^2$, $X^1$ and $X^2$ can be taken together to form a single bidentate ligand; and $R^{23}$, $R^{24}$, and $R^{25}$ are lower alkyl.

15. A cyclic hydrocarbon polymer substantially free of linear contaminants and having a number average molecular weight of at least about 150 kD.

16. The polymer of claim 15, having a number average molecular weight of at least about 500 kD.

17. The polymer of claim 16, having a number average molecular weight of at least about 1000 kD.

18. The polymer of claim 17, having a number average molecular weight of at least about 1200 kD.

19. The polymer of claim 15, comprising a cyclic polyoctenamer.

20. The polymer of claim 15, comprising cyclic polyethylene.

21. The polymer of claim 15, comprising cyclic polybutadiene.

22. A polymer blend comprising the polymer of claim 15 and at least one second polymer.

* * * * *